(12) United States Patent
Yu

(10) Patent No.: US 10,904,795 B2
(45) Date of Patent: Jan. 26, 2021

(54) REMAPPING QUALITY OF SERVICE FLOWS AMONG DATA RADIO BEARERS

(71) Applicant: QUALCOMM Incorporated, San Diego, CA (US)

(72) Inventor: Yu-Ting Yu, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/446,251

(22) Filed: Jun. 19, 2019

(65) Prior Publication Data
US 2019/0394680 A1 Dec. 26, 2019

Related U.S. Application Data

(60) Provisional application No. 62/688,379, filed on Jun. 21, 2018.

(51) Int. Cl.
*H04W 28/16* (2009.01)
*H04W 76/30* (2018.01)
*H04W 88/02* (2009.01)

(52) U.S. Cl.
CPC .......... *H04W 28/16* (2013.01); *H04W 76/30* (2018.02); *H04W 88/02* (2013.01)

(58) Field of Classification Search
CPC ..... H04W 48/06; H04W 48/16; H04W 36/26; H04W 84/12; H04W 8/18; H04W 88/06; H04W 24/10; H04W 72/1231; H04W 88/08; H04L 43/06; H04L 1/0026; H04L 1/0027; H04L 43/16; H04L 43/0823; H04L 41/5032; H04L 43/0852
See application file for complete search history.

(56) References Cited

U.S. PATENT DOCUMENTS

| | | | | |
|---|---|---|---|---|
| 2002/0141393 | A1* | 10/2002 | Eriksson | H04L 69/16 370/352 |
| 2006/0218271 | A1* | 9/2006 | Kasslin | H04L 43/06 709/224 |
| 2007/0002868 | A1* | 1/2007 | Qian | H04W 28/24 370/395.21 |
| 2007/0217349 | A1* | 9/2007 | Fodor | H04W 48/18 370/310.2 |

(Continued)

FOREIGN PATENT DOCUMENTS

WO WO-2018202205 A1 11/2018

OTHER PUBLICATIONS

International Search Report and Written Opinion—PCT/US2019/038282—ISA/EPO—dated Oct. 18, 2019.

(Continued)

*Primary Examiner* — Jung Liu
(74) *Attorney, Agent, or Firm* — Holland & Hart LLP

(57) ABSTRACT

Methods, systems, and devices for wireless communication are described. Double remapping of Quality of Service (QoS) flows between radio bearers may be avoided through disclosed techniques, aspects of which may include determining a release procedure for a QoS flow from a first radio bearer, such as whether or not the release procedure is or is part of a remapping procedure, based on configuration information for a second radio bearer, such as whether the QoS flow is added to any radio bearer other than the first radio bearer.

29 Claims, 20 Drawing Sheets

(56) References Cited

U.S. PATENT DOCUMENTS

| | | | | |
|---|---|---|---|---|
| 2010/0103863 | A1* | 4/2010 | Ulupinar | H04L 29/12207 370/315 |
| 2012/0026880 | A1* | 2/2012 | Miller | H04W 4/90 370/235 |
| 2012/0026947 | A1* | 2/2012 | Miller | H04W 28/24 370/329 |
| 2014/0162676 | A1* | 6/2014 | Shaw | H04W 76/00 455/452.2 |
| 2014/0226470 | A1* | 8/2014 | Kim | H04W 28/0268 370/230 |
| 2014/0233380 | A1* | 8/2014 | Kim | H04L 47/24 370/230 |
| 2015/0257159 | A1* | 9/2015 | Speicher | H04W 28/10 370/235 |
| 2015/0271838 | A1* | 9/2015 | Szilagyi | H04W 72/1263 370/336 |
| 2016/0227443 | A1* | 8/2016 | Tomici | H04W 8/04 |
| 2016/0227467 | A1* | 8/2016 | Tomici | H04W 8/18 |
| 2017/0085452 | A1* | 3/2017 | Kato | H04L 43/0811 |
| 2017/0111826 | A1* | 4/2017 | Sankar | H04W 72/0413 |
| 2018/0220327 | A1* | 8/2018 | Karampatsis | H04W 28/0289 |
| 2019/0021064 | A1* | 1/2019 | Ryu | H04W 76/27 |
| 2019/0364492 | A1* | 11/2019 | Azizi | H04W 68/005 |

OTHER PUBLICATIONS

Ericsson: "QoS Flow Remapping and End Marker", 3GPP Draft; R2-1805507—QoS Flow Remapping and End Marker, 3rd Generation Partnership Project (3GPP), Mobile Competence Centre ; 650, Route Des Lucioles ; F-06921 Sophia-Antipolis Cedex ; France, vol. RAN WG2, No. Sanya, P. R China; Apr. 16, 2018-Apr. 20, 2018, Apr. 5, 2018 (Apr. 5, 2018), XP051415101, 5 Pages, Retrieved from the Internet: URL:http://www.3gpp.org/ftp/tsg%5Fran/WG2% 5FRL2/TSGR2%5F101bis/Docs/ [retrieved on Apr. 5, 2018], paragraph [8002]; figure 1, p. 3, line 3-line 5, p. 2, line 1-line 2, section 3.1; pp. 1-2 p. 5, lines 21-24.

Huawei et al., "QoS Flow to DRB Mapping", 3GPP Draft; R2-1701205, 3rd Generation Partnership Project (3GPP), Mobile Competence Centre ; 650, Route Des Lucioles ; F-06921 Sophia-Antipolis Cedex; France, vol. RAN WG2, No. Athens, Greece; Feb. 13, 2017-Feb. 17, 2017, Feb. 4, 2017 (Feb. 4, 2017), XP051223422, 6 Pages, Retrieved from the Internet: URL:http://www.3gpp.org/ftp/ tsg_ran/WG2_RL2/TSGR2_97/Docs/ [retrieved on Feb. 4, 2017], sections 3.1, 3.2; pp. 1-5.

Mediatek Inc: "SDAP Header Design for Reflective QoS Indication and QoS Flow Remapping", 3GPP Draft; R2-1708260 SDAP Header Design for Reflective QoS Indication and QoS Flow Remapping, 3rd Generation Partnership Project (3GPP), Mobile Competence Centre ; 650, Route Des Lucioles ; F-06921 , vol. RAN WG2, No. Berlin, Germany; Aug. 21, 2017-Aug. 25, 2017, Aug. 20, 2017 (Aug. 20, 2017), XP051318160, 7 Pages, Retrieved from the Internet: URL:http://www.3gpp.org/ftp/Meetings_3GPP_SYNC/ RAN2/Docs/ [retrieved on Aug. 20, 2017], paragraph [02.2], p. 3, line 3-line 10, figure 1, paragraph [0005], paragraph [5.3.1], paragraph [5.3.2], sections 1, 2.1, 2.2; pp. 1-3.

Mediatek Inc: "Some remaining issues for QoS flow remapping", 3GPP Draft; R2-1807385 Some Remaining Issues for QoS Flow Remapping, 3rd Generation Partnership Project (3GPP), Mobile Competence Centre ; 650, Route Des Lucioles ; F-06921 Sophia-Antipolis Cedex ;France, vol. RAN WG2, No. Busan, South Korea; May 21, 2018-May 25, 2018, May 20, 2018 (May 20, 2018), XP051443784, 3 Pages, Retrieved from the Internet: URL:http:// www.3gpp.org/ftp/Meetings%5F3GPP%5FSYNC/RAN2/Docs/ [retrieved on May 20, 2018], section 2.1; pp. 1-2.

Nokia et al., "Default DRB & QoS Remapping", 3GPP Draft; 38300_CR0026R1_(REL-15)_R2-1808950_Stage 2 Default DRB, 3rd Generation Partnership Project (3GPP), Mobile Competence Centre; 650, Route Des Lucioles; F-06921 Sophia-Antipolis Cedex; France, vol. RAN WG2, No. Busan, South Korea; May 21, 2018-May 25, 2018, Jun. 7, 2018 (Jun. 7, 2018), XP051455901, 5 Pages, Retrieved from the Internet: URL:http://www.3gpp.org/ftp/Meetings% 5F3GPP%5FSYNC/RAN/Docs [retrieved on Jun. 7, 2018], p. 4, line 23-p. 5, line 3.

Partial International Search Report—PCT/US2019/038282—ISA/ EPO—dated Aug. 27, 2019.

* cited by examiner

REMAPPING QUALITY OF SERVICE FLOWS AMONG DATA RADIO BEARERS

CROSS REFERENCE

The present application for patent claims the benefit of U.S. Provisional Patent Application No. 62/688,379 by Yu, entitled "REMAPPING QUALITY OF SERVICE FLOWS AMONG DATA RADIO BEARERS," filed Jun. 21, 2018, assigned to the assignee hereof, and expressly incorporated herein.

BACKGROUND

The following relates generally to wireless communications, and more specifically to remapping Quality of Service (QoS) flows among data radio bearers.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Remapping procedures for QoS flows between radio bearers may result in double remapping procedures when a QoS release from a radio bearer is performed before the corresponding QoS add to another radio bearer. Also, processing service data adaptation protocol (SDAP) data before packet data convergence protocol (PDCP) data may result in the reprocessing or dropping of SDAP data delivered to the PDCP layer.

SUMMARY

Double remapping of Quality of Service (QoS) flows between radio bearers may be avoided in accordance with the teachings herein by determining whether a QoS flow released from a radio bearer is subject to a remapping to a non-default radio bearer. For example, a base station and a user equipment (UE) may treat a request that a QoS flow be added to a new radio bearer as an implicit indication to release the QoS flow from another radio bearer. As another example, the base station and the UE may use additional (e.g., explicit) signaling to indicate when a remapping procedure is being performed. As another example, a UE may make a global determination regarding whether any released QoS flow is added to any other radio bearer—if so, the UE may determine that the QoS flow is subject to a remapping procedure. As another example, a UE may make a global determination of QoS flow addition and release procedures and may process any addition procedures prior to processing any release procedures. As another example, the base station and the UE may rely on a radio resource control (RRC) entity at the UE to determine whether the released QoS flow is subject to a remapping to a non-default radio bearer, and the RRC entity may provide a related indication to a service data adaptation protocol (SDAP) entity at the UE. Additionally or alternatively, in some cases, the UE may be configured to process SDAP configuration (SDAP-Config) messages after processing packet data convergence protocol (PDCP) configurations.

A method of wireless communications at a UE is described. The method may include identifying a QoS flow mapped to a first radio bearer, the first radio bearer distinct from a default radio bearer, receiving configuration information related to a second radio bearer, the second radio bearer distinct from the default radio bearer, determining a release procedure for the QoS flow from the first radio bearer based on the configuration information related to the second radio bearer, and releasing the QoS flow from the first radio bearer in accordance with the determined release procedure.

An apparatus for wireless communications at a UE is described. The apparatus may include a processor, memory coupled with the processor, and instructions stored in the memory. The instructions may be executable by the processor to cause the apparatus to identify a QoS flow mapped to a first radio bearer, the first radio bearer distinct from a default radio bearer, receive configuration information related to a second radio bearer, the second radio bearer distinct from the default radio bearer, determine a release procedure for the QoS flow from the first radio bearer based on the configuration information related to the second radio bearer, and release the QoS flow from the first radio bearer in accordance with the determined release procedure.

Another apparatus for wireless communications at a UE is described. The apparatus may include means for identifying a QoS flow mapped to a first radio bearer, the first radio bearer distinct from a default radio bearer, receiving configuration information related to a second radio bearer, the second radio bearer distinct from the default radio bearer, determining a release procedure for the QoS flow from the first radio bearer based on the configuration information related to the second radio bearer, and releasing the QoS flow from the first radio bearer in accordance with the determined release procedure.

A non-transitory computer-readable medium storing code for wireless communications at a UE is described. The code may include instructions executable by a processor to identify a QoS flow mapped to a first radio bearer, the first radio bearer distinct from a default radio bearer, receive configuration information related to a second radio bearer, the second radio bearer distinct from the default radio bearer, determine a release procedure for the QoS flow from the first radio bearer based on the configuration information related to the second radio bearer, and release the QoS flow from the first radio bearer in accordance with the determined release procedure.

In some examples of the method, apparatuses, and non-transitory computer-readable medium described herein, releasing the QoS flow from the first radio bearer in accordance with the determined release procedure may include operations, features, means, or instructions for determining a radio bearer via which to transmit an end-marker control protocol data unit (PDU) for the QoS flow and transmitting the end-marker control PDU for the QoS flow via the determined radio bearer.

Some examples of the method, apparatuses, and non-transitory computer-readable medium described herein may further include operations, features, means, or instructions for determining that the configuration information related to the second radio bearer indicates an addition of the QoS flow to the second radio bearer and determining that the release procedure includes a remapping procedure based on the addition of the QoS flow to the second radio bearer.

Some examples of the method, apparatuses, and non-transitory computer-readable medium described herein may further include operations, features, means, or instructions for determining to release the QoS flow from the first radio bearer based on the addition of the QoS flow to the second radio bearer and releasing the QoS flow from the first radio bearer.

Some examples of the method, apparatuses, and non-transitory computer-readable medium described herein may further include operations, features, means, or instructions for receiving a control message for the second radio bearer, where the control message for the second radio bearer includes the configuration information related to the second radio bearer.

In some examples of the method, apparatuses, and non-transitory computer-readable medium described herein, receiving the control message for the second radio bearer may include operations, features, means, or instructions for receiving an SDAP-Config information element for the second radio bearer.

Some examples of the method, apparatuses, and non-transitory computer-readable medium described herein may further include operations, features, means, or instructions for receiving configuration information for a set of radio bearers, the set of radio bearers including the first radio bearer and the second radio bearer, determining that configuration information for the first radio bearer indicates a release of the QoS flow from the first radio bearer and evaluating, based on the release of the QoS flow from the first radio bearer, the configuration information for each other radio bearer of the set to determine whether the QoS flow may be added to any other radio bearer of the set.

In some examples of the method, apparatuses, and non-transitory computer-readable medium described herein, receiving configuration information for the set of radio bearers may include operations, features, means, or instructions for receiving a set of SDAP-Config information elements, each SDAP-Config information element of the set corresponding to a respective radio bearer of the set.

In some examples of the method, apparatuses, and non-transitory computer-readable medium described herein, releasing the QoS flow from the first radio bearer in accordance with the determined release procedure may include operations, features, means, or instructions for determining, based on determining that the QoS flow may be added to at least one other radio bearer of the set, not to transmit an end-marker control PDU for the QoS flow.

In some examples of the method, apparatuses, and non-transitory computer-readable medium described herein, releasing the QoS flow from the first radio bearer in accordance with the determined release procedure may include operations, features, means, or instructions for determining, based on determining that the QoS flow may be added to at least one other radio bearer of the set, not to execute an SDAP procedure for the first radio bearer.

Some examples of the method, apparatuses, and non-transitory computer-readable medium described herein may further include operations, features, means, or instructions for receiving a control message for the first radio bearer, where the control message for the first radio bearer includes the configuration information related to the second radio bearer and determining that the release procedure includes a remapping procedure based on the control message for the first radio bearer.

In some examples of the method, apparatuses, and non-transitory computer-readable medium described herein, receiving the control message for the first radio bearer may include operations, features, means, or instructions for receiving an SDAP-Config information element for the first radio bearer.

Some examples of the method, apparatuses, and non-transitory computer-readable medium described herein may further include operations, features, means, or instructions for identifying within the SDAP-Config information element a field indicating that the release procedure includes the remapping procedure.

Some examples of the method, apparatuses, and non-transitory computer-readable medium described herein may further include operations, features, means, or instructions for identifying within the SDAP-Config information element an additional field indicating a release of the QoS flow from the first radio bearer.

In some examples of the method, apparatuses, and non-transitory computer-readable medium described herein, the field indicates a remapping of the QoS flow from the first radio bearer to the second radio bearer.

Some examples of the method, apparatuses, and non-transitory computer-readable medium described herein may further include operations, features, means, or instructions for receiving configuration information for a set of radio bearers, the set of radio bearers including the first radio bearer and the second radio bearer, identifying a number of QoS flow addition procedures and a number of QoS flow release procedures based on the configuration information for the set of radio bearers and performing any identified QoS flow addition procedure prior to performing any identified QoS flow release procedure.

In some examples of the method, apparatuses, and non-transitory computer-readable medium described herein, receiving configuration information for the set of radio bearers may include operations, features, means, or instructions for receiving a set of SDAP-Config information elements, each SDAP-Config information element of the set corresponding to a respective radio bearer of the set.

In some examples of the method, apparatuses, and non-transitory computer-readable medium described herein, releasing the QoS flow from the first radio bearer in accordance with the determined release procedure may include operations, features, means, or instructions for determining, based on identifying a QoS flow addition procedure for the QoS flow, not to transmit an end-marker control PDU for the QoS flow.

In some examples of the method, apparatuses, and non-transitory computer-readable medium described herein, releasing the QoS flow from the first radio bearer in accordance with the determined release procedure may include operations, features, means, or instructions for determining, based on identifying a QoS flow addition procedure for the QoS flow, not to execute an SDAP procedure for the first radio bearer.

Some examples of the method, apparatuses, and non-transitory computer-readable medium described herein may further include operations, features, means, or instructions for receiving a control message common to a set of radio bearers, where the control message common to the set of radio bearers includes the configuration information related to the second radio bearer and determining, at a RRC layer that the release procedure includes a remapping procedure based on the control message common to the set of radio bearers.

In some examples of the method, apparatuses, and non-transitory computer-readable medium described herein, determining that the release procedure may include operations, features, means, or instructions for identifying, based on the control message common to the set of radio bearers, a release of the QoS flow from the first radio bearer and identifying, based on the control message common to the set of radio bearers, an addition of the QoS flow to the second radio bearer.

Some examples of the method, apparatuses, and non-transitory computer-readable medium described herein may further include operations, features, means, or instructions for transmitting, from the RRC layer to an SDAP layer, an indication of the remapping, where receiving the configuration information related to the second radio bearer includes receiving the indication of the remapping at the SDAP layer.

A method of wireless communications at a base station is described. The method may include identifying a QoS flow mapped to a first radio bearer, the first radio bearer distinct from a default radio bearer, determining a remapping of the QoS flow from the first radio bearer to a second radio bearer, the second radio bearer distinct from the default radio bearer, and transmitting configuration information related to the second radio bearer, the configuration information related to the second radio bearer indicating a release procedure for the QoS flow from the first radio bearer.

An apparatus for wireless communications at a base station is described. The apparatus may include a processor, memory coupled with the processor, and instructions stored in the memory. The instructions may be executable by the processor to cause the apparatus to identify a QoS flow mapped to a first radio bearer, the first radio bearer distinct from a default radio bearer, determine a remapping of the QoS flow from the first radio bearer to a second radio bearer, the second radio bearer distinct from the default radio bearer, and transmit configuration information related to the second radio bearer, the configuration information related to the second radio bearer indicating a release procedure for the QoS flow from the first radio bearer.

Another apparatus for wireless communications at a base station is described. The apparatus may include means for identifying a QoS flow mapped to a first radio bearer, the first radio bearer distinct from a default radio bearer, determining a remapping of the QoS flow from the first radio bearer to a second radio bearer, the second radio bearer distinct from the default radio bearer, and transmitting configuration information related to the second radio bearer, the configuration information related to the second radio bearer indicating a release procedure for the QoS flow from the first radio bearer.

A non-transitory computer-readable medium storing code for wireless communications at a base station is described. The code may include instructions executable by a processor to identify a QoS flow mapped to a first radio bearer, the first radio bearer distinct from a default radio bearer, determine a remapping of the QoS flow from the first radio bearer to a second radio bearer, the second radio bearer distinct from the default radio bearer, and transmit configuration information related to the second radio bearer, the configuration information related to the second radio bearer indicating a release procedure for the QoS flow from the first radio bearer.

In some examples of the method, apparatuses, and non-transitory computer-readable medium described herein, transmitting the configuration information related to the second radio bearer may include operations, features, means, or instructions for transmitting, as part of the configuration information related to the second radio bearer, an indication of an addition of the QoS flow to the second radio bearer.

In some examples of the method, apparatuses, and non-transitory computer-readable medium described herein, the indication of the addition implicitly indicates that the release procedure includes a remapping procedure.

In some examples of the method, apparatuses, and non-transitory computer-readable medium described herein, transmitting the configuration information related to the second radio bearer may include operations, features, means, or instructions for transmitting a control message for the second radio bearer, where the control message for the second radio bearer includes the configuration information related to the second radio bearer.

In some examples of the method, apparatuses, and non-transitory computer-readable medium described herein, transmitting the control message for the second radio bearer may include operations, features, means, or instructions for transmitting an SDAP-Config information element for the second radio bearer.

In some examples of the method, apparatuses, and non-transitory computer-readable medium described herein, transmitting the configuration information related to the second radio bearer may include operations, features, means, or instructions for transmitting a control message for the first radio bearer, where the control message for the first radio bearer includes the configuration information related to the second radio bearer.

In some examples of the method, apparatuses, and non-transitory computer-readable medium described herein, transmitting the control message for the first radio bearer may include operations, features, means, or instructions for transmitting an SDAP-Config information element for the first radio bearer.

Some examples of the method, apparatuses, and non-transitory computer-readable medium described herein may further include operations, features, means, or instructions for transmitting within the SDAP-Config information element a field indicating that the release procedure includes a remapping procedure.

Some examples of the method, apparatuses, and non-transitory computer-readable medium described herein may further include operations, features, means, or instructions for transmitting within the SDAP-Config information element an additional field indicating a release of the QoS flow from the first radio bearer.

In some examples of the method, apparatuses, and non-transitory computer-readable medium described herein, the field indicates a remapping of the QoS flow from the first radio bearer to the second radio bearer.

In some examples of the method, apparatuses, and non-transitory computer-readable medium described herein, transmitting the configuration information related to the second radio bearer may include operations, features, means, or instructions for transmitting a control message common to a set of radio bearers.

In some examples of the method, apparatuses, and non-transitory computer-readable medium described herein, transmitting the control message common to the set of radio bearers may include operations, features, means, or instructions for transmitting, to an RRC layer at a UE, a message that includes an indication that the release procedure may be a remapping of the QoS flow from the first radio bearer to the second radio bearer.

A method of wireless communications at a UE is described. The method may include receiving an RRC configuration message, the RRC configuration message identifying a radio bearer, configuring a PDCP entity for the radio bearer based on the RRC configuration message, determining, after configuring the PDCP entity, whether the RRC configuration message includes configuration information for an SDAP entity for the radio bearer based on the RRC configuration message, and communicating via the radio bearer in accordance with the RRC configuration message.

An apparatus for wireless communications at a UE is described. The apparatus may include a processor, memory coupled with the processor, and instructions stored in the memory. The instructions may be executable by the processor to cause the apparatus to receive a RRC configuration message, the RRC configuration message identifying a radio bearer, configure a PDCP entity for the radio bearer based on the RRC configuration message, determine, after configuring the PDCP entity, whether the RRC configuration message includes configuration information for an SDAP entity for the radio bearer based on the RRC configuration message, and communicate via the radio bearer in accordance with the RRC configuration message.

Another apparatus for wireless communications at a UE is described. The apparatus may include means for receiving a RRC configuration message, the RRC configuration message identifying a radio bearer, configuring a PDCP entity for the radio bearer based on the RRC configuration message, determining, after configuring the PDCP entity, whether the RRC configuration message includes configuration information for an SDAP entity for the radio bearer based on the RRC configuration message, and communicating via the radio bearer in accordance with the RRC configuration message.

A non-transitory computer-readable medium storing code for wireless communications at a UE is described. The code may include instructions executable by a processor to receive a RRC configuration message, the RRC configuration message identifying a radio bearer, configure a PDCP entity for the radio bearer based on the RRC configuration message, determine, after configuring the PDCP entity, whether the RRC configuration message includes configuration information for an SDAP entity for the radio bearer based on the RRC configuration message, and communicate via the radio bearer in accordance with the RRC configuration message.

Some examples of the method, apparatuses, and non-transitory computer-readable medium described herein may further include operations, features, means, or instructions for determining that the radio bearer identified in the RRC configuration message may be unconfigured.

Some examples of the method, apparatuses, and non-transitory computer-readable medium described herein may further include operations, features, means, or instructions for establishing the PDCP entity for the radio bearer, determining, after establishing the PDCP entity, that the RRC configuration message includes configuration information for the SDAP entity and establishing the SDAP entity based on the RRC configuration message.

Some examples of the method, apparatuses, and non-transitory computer-readable medium described herein may further include operations, features, means, or instructions for transmitting, after configuring the PDCP entity, an end-marker control PDU from the SDAP entity to the PDCP entity, the end-marker control PDU for a QoS flow mapped to the radio bearer.

Some examples of the method, apparatuses, and non-transitory computer-readable medium described herein may further include operations, features, means, or instructions for configuring the PDCP entity includes at least one of reestablishing the PDCP entity, performing data recovery for the PDCP entity, or reconfiguring the PDCP entity.

Some examples of the method, apparatuses, and non-transitory computer-readable medium described herein may further include operations, features, means, or instructions for determining that the RRC configuration message includes configuration information for the SDAP entity and establishing the SDAP entity after configuring the PDCP entity.

Some examples of the method, apparatuses, and non-transitory computer-readable medium described herein may further include operations, features, means, or instructions for transmitting, after configuring the PDCP entity, an end-marker control PDU from the SDAP entity to the PDCP entity, the end-marker control PDU for a QoS flow mapped to the radio bearer.

Some examples of the method, apparatuses, and non-transitory computer-readable medium described herein may further include operations, features, means, or instructions for determining that the radio bearer identified in the RRC configuration message may have been previously configured.

In some examples of the method, apparatuses, and non-transitory computer-readable medium described herein, the RRC configuration message includes an RRC reconfiguration message.

In some examples of the method, apparatuses, and non-transitory computer-readable medium described herein, the RRC configuration message includes a PDCP configuration message (e.g., a PDCP-Config message) and/or an SDAP configuration message (e.g., a SDAP-Config message). Some examples of the method, apparatuses, and non-transitory computer-readable medium described herein may further include operations, features, means, or instructions for processing information stored at the PDCP entity based at least in part on the PDCP configuration message; processing, at the SDAP entity after the information stored at the PDCP entity is processed, the SDAP configuration message, where an end marker PDU is constructed at the SDAP entity based at least in part on processing the SDAP configuration message; and signaling, from the SDAP entity to the PDCP entity, the end marker PDU.

DETAILED DESCRIPTION

Figure 1:
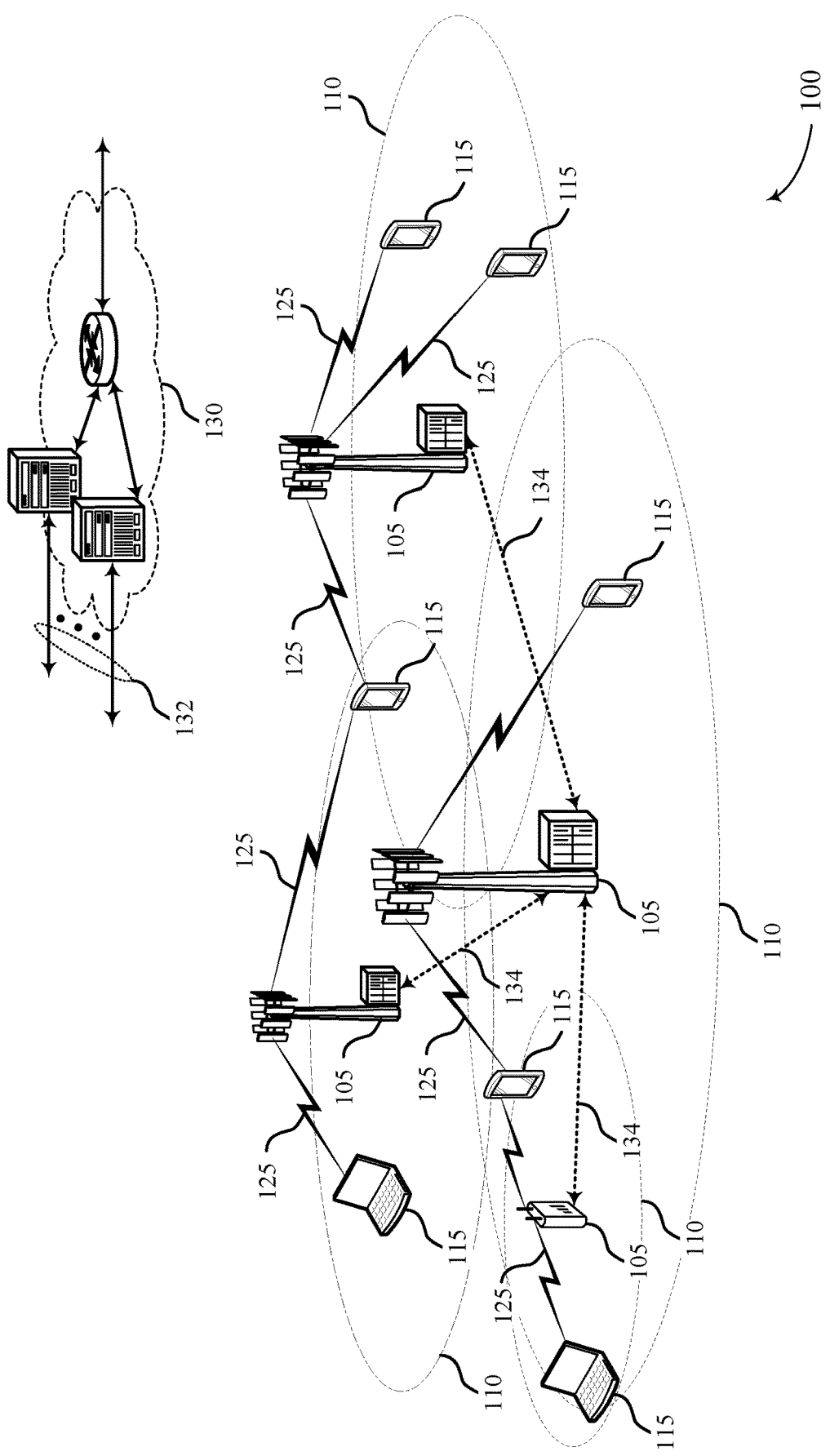
FIG. 1 illustrates an example of a wireless communications system that supports remapping Quality of Service (QoS) flows among data radio bearers in accordance with aspects of the present disclosure.

A radio bearer remapping process for a Quality of Service (QoS) flow may result in double remapping processes when a QoS flow is released from a current radio bearer before it is mapped to a target radio bearer. That is, the process for remapping a QoS flow from a current radio bearer to a target radio bearer may involve first mapping the QoS flow to a default radio bearer and releasing the QoS from the current radio bearer and then mapping the QoS flow to the target radio bearer. Radio bearer remapping may occur at a service data adaptation protocol (SDAP) entity at a receiving device.

In some cases, a radio bearer remapping process may configure SDAP configuration (SDAP-Config) messages so that a QoS flow is not double remapped. That is, when remapping a QoS flow from one radio bearer to another radio bearer, the network may ensure that the UE does not remap the QoS flow twice (e.g., to a default and a target radio bearer), but only maps the QoS flow to the target radio bearer. In this way, double remapping of QoS flows may be avoided.

For example, a radio bearer remapping process may be configured so that receiving an SDAP-Config message requesting that a QoS flow be added to a new radio bearer causes the receiving device to release the QoS flow from another radio bearer. In another example, a radio bearer remapping process may be configured to use additional signaling to indicate when a remapping procedure is being performed. In another example, a radio bearer remapping process may be configured so that a receiving device determines whether a received SDAP-Config message is a part of a radio bearer remapping message. In another example, a radio bearer remapping process may be configured so that a receiving device processes SDAP-Config messages adding QoS flows to radio bearers before SDAP-Config messages removing QoS flows from radio bearers. In another example, a radio bearer remapping process may be configured so that an RRC entity at a receiving device detects RRC-based remappings and signals a remapping indication to an SDAP at the receiving device.

A wireless device may be configured to process information for a SDAP layer before processing information for a PDCP layer. However, processing information for a SDAP layer before a PDCP layer may result in the reprocessing or dropping of SDAP packets (e.g., end marker PDUs which may be used to indicate to a base station that a QoS flow has been mapped to a new radio bearer).

In some cases, a device may be configured to process information received from an SDAP layer after processing information for a PDCP layer. In this way, the device may avoid redundant end marker processing and may avoid flushing an end marker at the PDCP layer during a PDCP reestablishment procedure, for example.

Aspects of the disclosure are initially described in the context of a wireless communications system. Aspects of the disclosure are further illustrated by and described with reference to apparatus diagrams, system diagrams, and flowcharts that relate to remapping QoS flows among data radio bearers.

FIG. 1 illustrates an example of a wireless communications system 100 that supports remapping QoS flows among data radio bearers in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and radio bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the radio bearer or PDCP layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may perform remapping procedures for QoS flows between radio bearers. QoS flows may be associated with a particular bit error rate and priority level and used to transmit particular types of data. For instance, a QoS flow having a low bit error rate and high priority level may be used to transmit high priority data while a QoS having a high bit error rate and low priority level may be used to transmit lower priority data. In some cases, a remapping procedure for a QoS flow from a current radio bearer to a target radio bearer may result in a double remapping—e.g., a mapping of the QoS flow to a default radio bearer and then to the target radio bearer.

In some examples, a UE 115 may identify a QoS flow mapped to a first radio bearer, the first radio bearer distinct from a default radio bearer; receive configuration information related to a second radio bearer, the second radio bearer distinct from the default radio bearer; determine a release procedure for the QoS flow from the first radio bearer based at least in part on the configuration information related to the second radio bearer; and release the QoS flow from the first radio bearer in accordance with the determined release procedure.

In some examples, a base station 105 may identify a QoS flow mapped to a first radio bearer, the first radio bearer distinct from a default radio bearer; determine a remapping of the QoS flow from the first radio bearer to a second radio bearer, the second radio bearer distinct from the default radio bearer; and transmit configuration information related to the second radio bearer, the configuration information related to the second radio bearer indicating a release procedure for the QoS flow from the first radio bearer. In this way, wireless communications system 100 may avoid double remappings.

Wireless communications system 100 may process SDAP-Config information before PDCP information. In some cases, processing SDAP-Config information before PDCP information results in the PDCP processing unit reprocessing or discarding SDAP messages that are stored at the PDCP layer. In some examples, a UE 115 may receive a RRC configuration message that identifies a radio bearer; configure a PDCP entity for the radio bearer based at least in part on the RRC configuration message; determine, after configuring the PDCP entity, whether the RRC configuration message includes configuration information for a SDAP entity for the radio bearer based at least in part on the RRC configuration message; and communicate via the radio bearer in accordance with the RRC configuration message. In this way, a UE 115 may process SDAP information after PDCP information and prevent the reprocessing or discarding of SDAP information at the PDCP layer.

Figure 2:
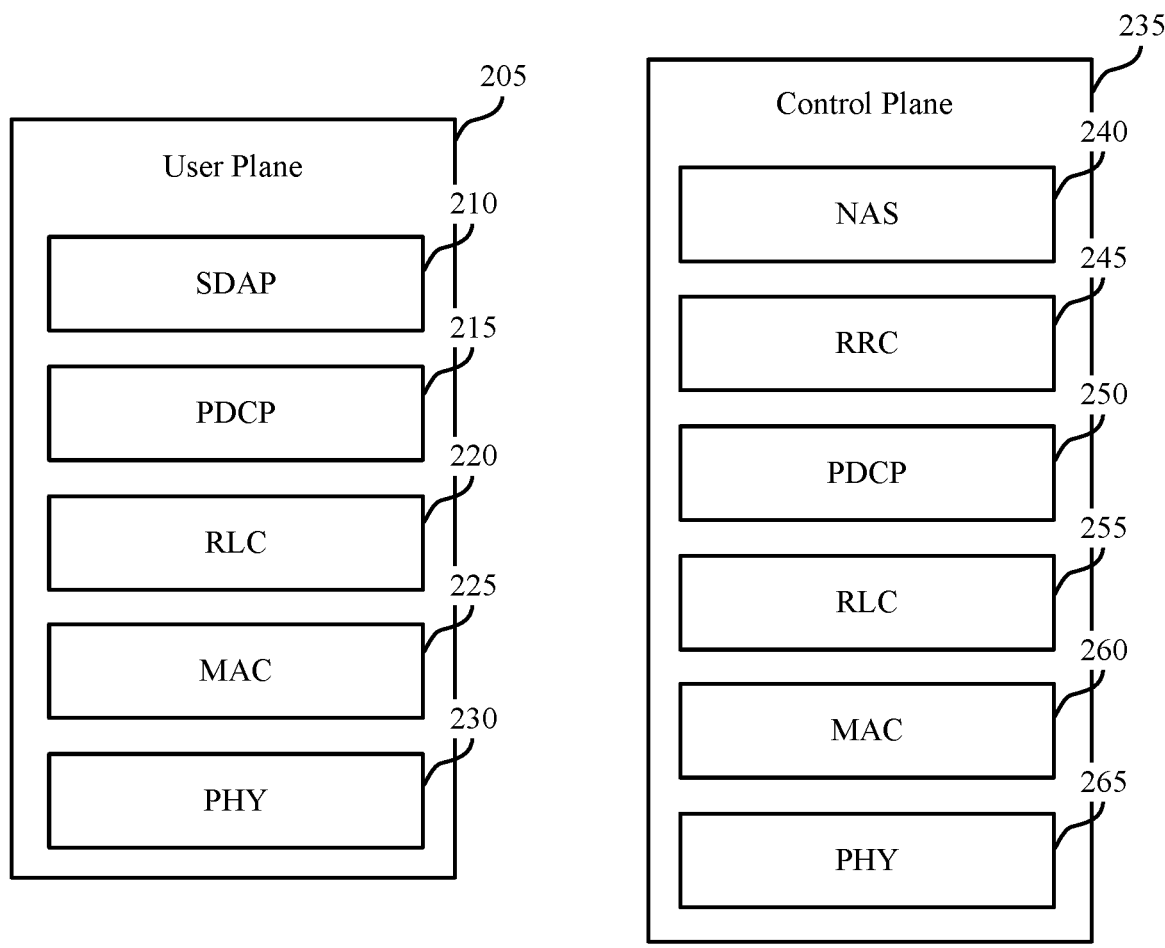
FIG. 2 illustrates example protocol layer stacks for remapping QoS flows among radio bearers in accordance with various aspects of the present disclosure.

FIG. 2 illustrates example protocol layer stacks 200 for remapping QoS flows among radio bearers in accordance with various aspects of the present disclosure. Protocol layer stacks 200 may illustrate aspects of a transmission between a UE 115 and a base station 105, as described above with reference to FIG. 1. Protocol layer stacks 200 may include user plane layer stack 205 and control plane layer stack 235.

User plane layer stack 205 may be used to package and open packaged data messages according to a certain protocol so that the data messages may be communicated between a UE and base station. User plane layer stack 205 may include SDAP layer 210, PDCP layer 215, radio link control (RLC) layer 220, media access control (MAC) layer 225, and physical (PHY) layer 230.

SDAP layer 210 may be used to map QoS flows to radio bearers, such as data radio bearers. SDAP layer 210 may include one or more SDAP entities. The one or more SDAP entities may be established on a per protocol data unit (PDU) session basis. An SDAP entity may manage one or more radio bearers and may map the QoS flows to radio bearers based on receiving SDAP-Config messages. Each SDAP-Config message may carry information for a particular radio bearer—e.g., an SDAP-Config message for a radio bearer may include an indication of a QoS flow, along with an indication of whether the QoS flow should be removed from or added to the radio bearer.

PDCP layer 215 may be used to process data received over a radio bearer. PDCP layer 215 may perform processing such as adding security to a data packet. PDCP layer 215 may also receive information from SDAP layer 210 (e.g., end marker PDUs) and store the SDAP information in a buffer. RLC layer 220, MAC layer 225, and PHY layer 230 may be used to perform transmissions of user data over wireless spectrum.

Control plane layer stack 235 may be used to package and open packaged control messages according to a certain protocol so that the control messages may be communicated between a UE and base station. Control plane layer stack 235 may include non-access stratum (NAS) layer 240, RRC layer 245, PDCP layer 250, RLC layer 255, MAC layer 260, and PHY layer 265.

RRC layer 245 may identify a remapping message and transmit a remapping indication to SDAP layer 210. RLC layer 255, MAC layer 260, and PHY layer 265 may be used to perform transmissions of control data over wireless spectrum.

Figure 3:
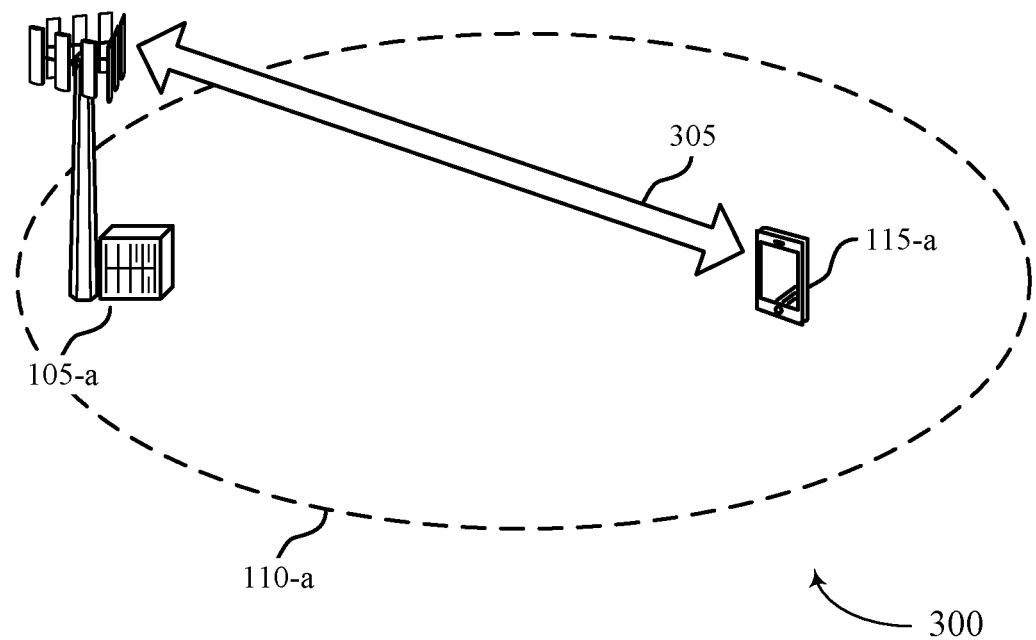
FIG. 3 illustrates an example of a wireless communications subsystem that supports remapping QoS flows among radio bearers in accordance with various aspects of the present disclosure.
Figure 3:
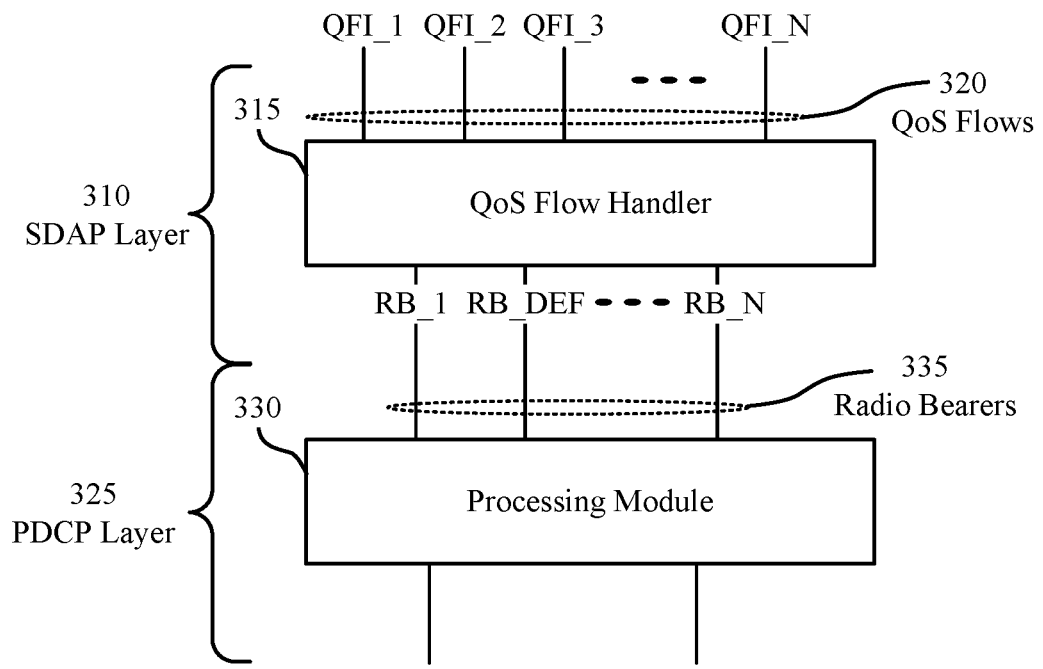

FIG. 3 illustrates an example of a wireless communications subsystem 300 that supports remapping QoS flows among radio bearers in accordance with various aspects of the present disclosure. Wireless communications subsystem 300 may include UE 115-a and base station 105-a, which may be examples of a UE 115 or a base station 105 and may communicate with one another via communication link 305 as described above with reference to FIG. 1.

Wireless communications subsystem 300 may be configured to remap QoS flows between radio bearers ("remapping procedure"). Wireless communications subsystem 300 may also be configured to perform an end marker transmission procedure after determining that a QoS flow is not assigned to a radio bearer. To perform a remapping procedure, a base station may transmit one or more SDAP-Config messages to a UE, where a first SDAP-Config message may include an indication of a QoS flow and a first radio bearer from which to remove (or release) the QoS flow and a second SDAP-Config message may include an indication of the QoS flow and a second radio bearer to which to add the QoS flow.

A UE may receive and process the SDAP-Config messages in an orderly fashion (e.g., according to an index or other order of corresponding radio bearers or according to an order in which SDAP-Config messages are received). In some cases, the UE may process the first SDAP-Config message indicating that the QoS flow is to be removed (or released) from the first radio bearer (the indication may be referred to as mappedQoS-FlowsToRelease) before processing the second SDAP-Config message indicating that the QoS flow is to be added to the second radio bearer (the indication may be referred to as mappedQoS-FlowsToAdd). In such a case, the UE may remove the QoS flow from the first radio bearer. The UE may then determine that the QoS flow is not assigned to any radio bearers and move the QoS flow to a default radio bearer (e.g., RB_DEF)—QoS flows that are not assigned to radio bearers may be automatically moved to default radio bearers. After moving the QoS flow to the default radio bearer, the UE may transmit an end marker over the default radio bearer. The UE may then process the second SDAP-Config message and determine that the same QoS flow is to be moved to a second radio bearer. The UE may then determine that the QoS flow is attached to the default radio bearer, release the QoS flow from the default radio bearer, and move the QoS flow to the second radio bearer. After moving the QoS flow to the second radio bearer, the UE may transmit an end marker over the second radio bearer. Performing a remapping procedure in this way results in a double remapping of the QoS flow—i.e., first to the default radio bearer and second to the second (target) radio bearer—and transmission of redundant end markers, increasing overhead and latency for a remapping procedure.

Similarly, a UE may receive a first SDAP-Config message that indicates a QoS flow and a first radio bearer to which to add the QoS flow and a second SDAP-Config message that that indicates the QoS flow and a second radio bearer from which to remove the QoS flow. In such cases, the UE may first map the QoS flow to the first radio bearer based on the first SDAP-Config message. Thus, the QoS flow may be simultaneously mapped to the first radio bearer and the second radio bearer. Then, after processing the second SDAP-Config message, the UE may remove the QoS flow from the second radio bearer. Performing a remapping procedure in this way may result in a redundant mapping of the QoS flow to the first radio bearer and the second radio bearer—e.g., if the second SDAP-Config message is improperly received.

In some cases, wireless communications subsystem 300 may be configured to process SDAP-Config messages so that a QoS flow is not double remapped or redundantly mapped to two radio bearers. That is, when remapping a QoS flow from one radio bearer to another radio bearer, the network may ensure that the UE does not remap the QoS flow twice (e.g., to a default radio bearer such as RB_DEF and a target radio bearer such as RB_1), but only maps the QoS flow to the target radio bearer. In this way, wireless communications subsystem 300 may avoid double remapping or redundant mapping of QoS flows 320 to radio bearers 335. The radio bearers 335 may include, for example, data radio bearers.

For example, wireless communications subsystem 300 may be configured so that receiving an SDAP-Config requesting that a QoS flow be added to a new radio bearer causes the receiving device to release the QoS flow from another radio bearer. That is, when an SDAP-Config message includes an indication that a QoS flow is to be added to a second radio bearer and the QoS flow is already mapped to a first radio bearer, a UE may assume that the QoS flow is no longer meant to be mapped to the first radio bearer. Thus, addition of a QoS flow to a radio bearer may imply release of the QoS flow from any radio bearer to which the QoS flow was previously mapped, and an indication to add a QoS flow to a radio bearer may comprise an implicit indicator to release the QoS flow from any radio bearer to which the QoS flow was previously mapped.

In such cases, base station 105-*a* may transmit, to UE 115-*a*, an SDAP-Config message causing UE 115-*a* to remap a QoS flow from a first radio bearer to a second radio bearer, other than a default radio bearer (e.g., RB_DEF). The SDAP-Config message may include an indication that the QoS flow is to be added to a second radio bearer (which may be referred to as mappedQoS-FlowsToAdd), along with a parameter identifying the second radio bearer that the QoS flow is to be added to. In some examples, the SDAP-Config message does not include a parameter indicating that the QoS flow is to be released from the first radio bearer. UE 115-*a* may receive the SDAP-Config message and may add the QoS flow to the second radio bearer based on the information included in the SDAP-Config message. UE 115-*a* may also transmit an end marker message (or PDU) over the second radio bearer. UE 115-*a* may then identify the first radio bearer mapped to the QoS flow and may release the QoS flow from the first radio bearer. In some cases, the SDAP-Config message that includes the indication that the QoS flow is to be added to a second radio bearer may be specific to (e.g., respectively correspond to) the second radio bearer, and may be distinct form an SDAP-Config message for the first radio bearer.

In another example, wireless communications subsystem 300 may be configured to use additional signaling to indicate when a remapping procedure is being performed. In such cases, base station 105-*a* may transmit, to UE 115-*a*, multiple SDAP-Config messages causing UE 115-*a* to remap a QoS flow from a first radio bearer to a second radio bearer, other than a default radio bearer (e.g., RB_DEF). Base station 105-*a* may send a first SDAP-Config message indicating a QoS flow to release from a first radio bearer and a second SDAP-Config message indicating that the QoS flow is to be added to a second radio bearer. In some cases, one or both of the SDAP-Config messages may include a parameter (e.g., in a field of an SDAP-Config message) indicating that the SDAP-Config message is a radio bearer remapping message (e.g., as opposed to including in a field of the SDAP-Config message, a parameter indicating the adding or releasing a QoS flow without also indicating whether the release or add is part of a remapping). In other cases, base station 105-*a* may transmit an additional message indicating at least that the SDAP-Config message indicating the QoS flow is to be released is a radio bearer remapping message.

In either case, UE 115-*a* may receive the indication that the SDAP-Config message(s) are radio bearer remapping message(s). After identifying that the SDAP-Config messages(s) are radio bearer remapping message(s), UE 115-*a* may release the identified QoS flow from the first radio bearer and refrain from moving the QoS flow identified in the SDAP-Config message to a default radio bearer (e.g., RB_DEF). UE 115-*a* may then move the QoS flow to the second radio bearer indicated in the second SDAP-Config message. UE 115-*a* may also transmit an end marker message (or PDU) over the second radio bearer. If the additional message or parameter indicating that the SDAP-Config message is a radio bearer remapping message is not transmitted, UE 115-*a* may determine that the received SDAP-Config message is not a radio bearer remapping message and may release the identified QoS flow from the identified radio bearer and move the identified QoS flow to a default radio bearer (e.g., RB_DEF).

In another example, wireless communications subsystem 300 may be configured so that a UE determines whether a received SDAP-Config message is a part of a radio bearer remapping message. In such cases, base station 105-*a* may transmit, to UE 115-*a*, an SDAP-Config message causing UE 115-*a* to remap a QoS flow from a first radio bearer to a second radio bearer, other than a default radio bearer (e.g., RB_DEF). Base station 105-*a* may send a first SDAP-Config message indicating a QoS flow to release from a first radio bearer and a second SDAP-Config message indicating that the QoS flow is to be added to a second radio bearer. UE 115-*a* may receive the SDAP-Config messages and may determine that the first SDAP-Config message indicates the release of a QoS flow. UE 115-*a* may then examine other SDAP-Config messages, including the second SDAP-Config message, received by UE 115-*a*. UE 115-*a* may determine that the second SDAP-Config message includes an indication that the same QoS flow is to be added to the second radio bearer. After identifying that the same QoS flow is to be released from a first radio bearer and added to the second radio bearer, UE 115-*a* may release the QoS flow from the current radio bearer and refrain from moving the identified QoS flow to a default radio bearer (e.g., RB_DEF). UE 115-*a* may then move the QoS flow to the second radio bearer. After moving the QoS flow to the second radio bearer, UE 115-*a* may also transmit an end marker message (or PDU) over the second radio bearer.

In another example, wireless communications subsystem 300 may be configured so that a UE processes SDAP-Config messages adding QoS flows 320 to radio bearers 335 before SDAP-Config messages removing QoS flows 320 from radio bearers 335. In such cases, base station 105-*a* may send multiple SDAP-Config messages to UE 115-*a*. Some SDAP-Config messages may indicate that a QoS flow is to be removed from a radio bearer, while other SDAP-Config message may indicate that the QoS flow is to be added to a radio bearer. Certain SDAP-Config message pairs may be sent as part of a radio bearer remapping message. UE 115-*a* may receive the SDAP-Config messages and may determine which of the SDAP-Config messages add QoS flows 320 to radio bearers 335 and which SDAP-Config messages remove QoS flows 320 from radio bearers 335. UE 115-*a* may then add the QoS flows 320 to the corresponding radio bearers 335. UE 115-*a* may then transmit end marker messages for the QoS flows 320 on the new radio bearers 335. After adding the QoS flows 320 to the corresponding radio bearers 335, UE 115-*a* may process the SDAP-Config messages indicating that QoS flows 320 are to be removed from the radio bearers 335 and remove the QoS flows 320 from the corresponding radio bearers 335.

In another example, wireless communications subsystem 300 may be configured so that an RRC entity at the UE detects RRC-based remappings and signals a remapping indication to an SDAP at the UE. The remapping indication may include an indication of the QoS flow, an indication of the radio bearer from which the QoS flow is to be removed, and an indication of the radio bearer from which the QoS flow is to be added. In such cases, base station 105-*a* may transmit, to UE 115-*a*, multiple SDAP-Config messages causing UE 115-*a* to remap a QoS flow from a first radio bearer to a second radio bearer, other than a default radio bearer (e.g., RB_DEF). For instance, base station 105-*a* may send a first SDAP-Config message indicating a QoS flow to release from a first radio bearer and a second SDAP-Config message indicating that the QoS flow is to be added to a second radio bearer. UE 115-*a* may receive the SDAP-Config messages, and an RRC at UE 115-*a* may process the SDAP-Config messages. The RRC entity may determine that the SDAP-Config messages are a part of a radio bearer remapping procedure, and may signal, to an SDAP layer 310 at UE 115-*a* in a remapping indication, that the SDAP-Config messages are a part of a radio bearer remapping procedure.

In this case, the remapping indication may include an indication of the QoS flow, the first radio bearer, and the second radio bearer. The SDAP layer 310 at UE 115-*a* may receive the remapping indication and may determine an end marker transmission procedure based on the RRC remapping indication. That is, the SDAP layer 310 may release the QoS flow from the first radio bearer and refrain from moving the QoS flow to a default radio bearer (e.g., RB_DEF) and sending an end marker message over the default radio bearer. The SDAP layer 310 may then add the QoS flow to the second radio bearer and send the end marker message over the second radio bearer.

Wireless communications subsystem 300 may be configured to process information for an SDAP layer before processing information for a PDCP layer. For instance, a UE may receive an SDAP-Config message and a PDCP configuration (PDCP-Config) message (e.g., a PDCP reestablishment message). In some cases, the UE may receive the SDAP-Config and PDCP-Config message in an RRC message that identifies a radio bearer. The UE may process, at an SDAP layer, the SDAP-Config message as discussed above, removing, adding, or remapping QoS flows to other radio bearers. After doing so, the QoS flow handler may generate and send an end marker message over the relevant radio bearer to a PDCP layer, which may process—e.g., add security measures—and store the end marker message at a processing module (e.g., in a buffer). The UE may then process the received PDCP-Config message and/or any information stored at a PDCP layer.

Dependent on which mode the UE is configured for, RLC Acknowledged Mode (AM) or RLC Unacknowledged Mode (UM), the UE may process the data stored at the processing module differently during processing of the received PDCP-Config message. If the UE is in RLC AM, then the processing module may reprocess and recipher all of the data stored at the processing module during processing of the received PDCP-Config message. In such a case, the processing module may reprocess an end marker message that has already been processed, which may increase the processing load at the UE. If the UE is in RLC AM, then the processing module may flush all of the data stored at the processing module. In such a case, the processing module may discard a processed end marker message received from the QoS flow handler and the processed end marker message may never be sent to the base station or network.

In some cases, wireless communications subsystem 300 may be configured to process information received from SDAP layer 310 after processing information for PDCP layer 325. In this way, wireless communications subsystem 300 may avoid redundant end marker processing and may avoid flushing an end marker at PDCP layer 325 during a PDCP reestablishment procedure, for example.

For example, wireless communications subsystem 300 may be configured so that SDAP-Config messages are processed after PDCP configuration (PDCP-Config) messages. In such cases, base station 105-*a* may transmit, to UE 115-*a*, one or more SDAP-Config and PDCP-Config messages (e.g., in an RRC message that identifies a radio bearer). UE 115-*a* may receive the SDAP-Config and the PDCP-Config messages—e.g., concurrently or within a designated time window.

After receiving the SDAP-Config and PDCP-Config messages, UE 115-*a* may process the PDCP-Config message at PDCP layer 325. If UE 115-*a* is operating in an RLC AM, processing module 330 may recipher and reprocess any data stored at processing module 330 while processing the PDCP-Config message. If UE 115-*a* is operating in an RLC UM, processing module 330 may flush any data stored at processing module 330 while processing the PDCP-Config message. After processing the PDCP-Config message, UE 115-*a* may process the SDAP-Config message at SDAP Layer 310. After processing the SDAP-Config message, SDAP Layer 310 may construct and send an SDAP message (e.g., an end marker PDU) to PDCP layer 325, where the SDAP message be processed—e.g., at processing module 330.

Ins some cases, after receiving the SDAP-Config and PDCP-Config messages, UE 115-*a* may configure a PDCP entity for the radio bearer based on the RRC configuration message. In some cases, configuring the PDCP entity includes processing any data stored at processing module 330. After configuring the PDCP entity, UE 115-*a* may determine whether the RRC configuration message also includes configuration information for an SDAP entity for the radio bearer. UE 115-*a* may configure the SDAP entity based on determining that the RRC configuration message also includes for the SDAP entity. In some cases, configuring the SDAP entity includes constructing an end marker PDU message that is subsequently transmitted to the PDCP entity.

The SDAP-Config messages may include SDAP-Config messages for remapping a QoS flow to a different radio bearer, SDAP-Config messages for releasing a QoS flow from a radio bearer, and/or SDAP-Config messages for adding a QoS flow to a radio bearer. QoS flow handler 315 may remove and move QoS flows 320 as indicated in the SDAP-Config messages. QoS flow handler 315 may also generate and send end marker messages to processing module 330 based on the releasing and removing of QoS flows 320—e.g., in accordance with any of the above examples.

Figure 4:
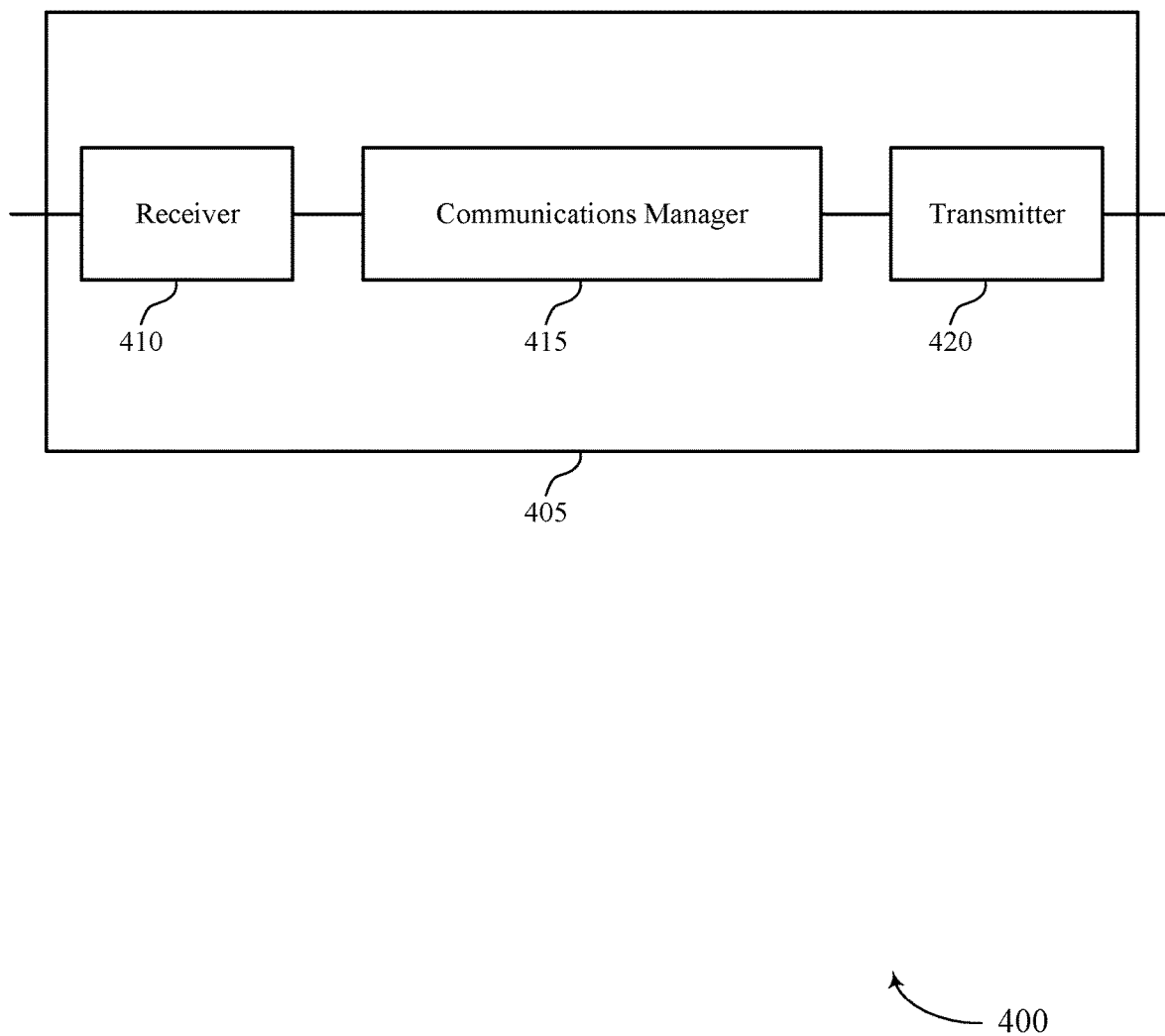
FIGS. 4 and 5 show block diagrams of devices that support remapping QoS flows among data radio bearers in accordance with aspects of the present disclosure.

FIG. 4 shows a block diagram 400 of a device 405 that supports remapping QoS flows among data radio bearers in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to remapping QoS flows among data radio bearers, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a QoS flow mapped to a first radio bearer, the first radio bearer distinct from a default radio bearer, receive configuration information related to a second radio bearer, the second radio bearer distinct from the default radio bearer, determine a release procedure for the QoS flow from the first radio bearer based on the configuration information related to the second radio bearer, and release the QoS flow from the first radio bearer in accordance with the determined release procedure.

The communications manager 415 may also receive a RRC configuration message, the RRC configuration message identifying a radio bearer, configure a PDCP entity for the radio bearer based on the RRC configuration message, determine, after configuring the PDCP entity, whether the RRC configuration message includes configuration information for a SDAP entity for the radio bearer based on the RRC configuration message, and communicate via the radio bearer in accordance with the RRC configuration message. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
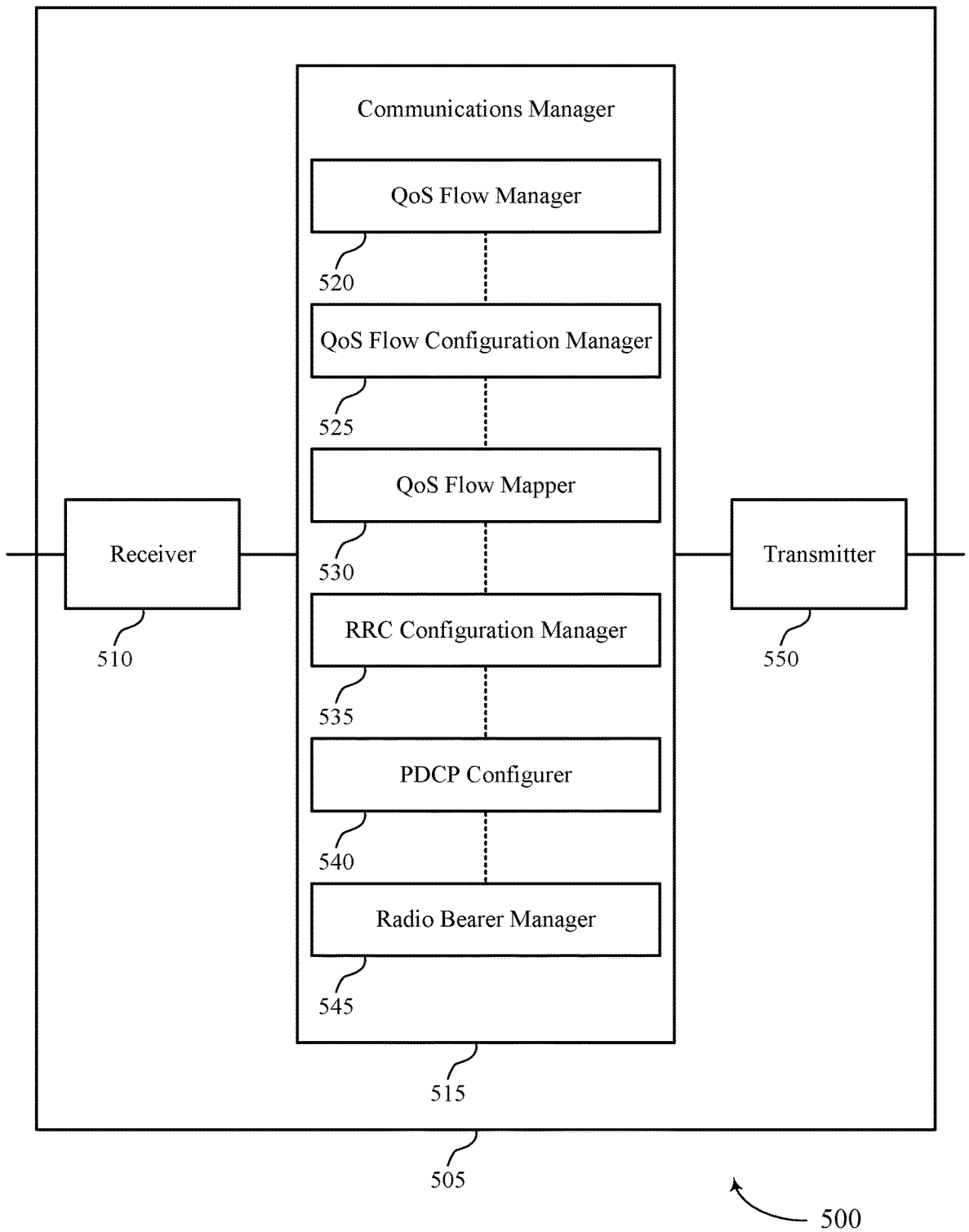

FIG. 5 shows a block diagram 500 of a device 505 that supports remapping QoS flows among data radio bearers in accordance with aspects of the present disclosure. The device 505 may be an example of aspects of a device 405 or a UE 115 as described herein. The device 505 may include a receiver 510, a communications manager 515, and a transmitter 550. The device 505 may also include a processor. Each of these components may be in communication with one another (e.g., via one or more buses).

The receiver 510 may receive information such as packets, user data, or control information associated with various information channels (e.g., control channels, data channels, and information related to remapping QoS flows among data radio bearers, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a QoS flow manager 520, a QoS flow configuration manager 525, a QoS flow mapper 530, a RRC configuration manager 535, a PDCP configurer 540, and a radio bearer manager 545. The communications manager 515 may be an example of aspects of the communications manager 710 described herein.

The QoS Flow manager 520 may identify a QoS flow mapped to a first radio bearer, the first radio bearer distinct from a default radio bearer. The QoS Flow configuration manager 525 may receive configuration information related to a second radio bearer, the second radio bearer distinct from the default radio bearer. The QoS Flow mapper 530 may determine a release procedure for the QoS flow from the first radio bearer based on the configuration information related to the second radio bearer and release the QoS flow from the first radio bearer in accordance with the determined release procedure.

The RRC configuration manager 535 may receive an RRC configuration message, the RRC configuration message identifying a radio bearer.

The PDCP configurer 540 may configure a PDCP entity for the radio bearer based on the RRC configuration message.

The QoS Flow configuration manager 525 may determine, after configuring the PDCP entity, whether the RRC configuration message includes configuration information for a SDAP entity for the radio bearer based on the RRC configuration message.

The radio bearer manager 545 may communicate via the radio bearer in accordance with the RRC configuration message.

The transmitter 550 may transmit signals generated by other components of the device 505. In some examples, the transmitter 550 may be collocated with a receiver 510 in a transceiver module. For example, the transmitter 550 may be an example of aspects of the transceiver 720 described with reference to FIG. 7. The transmitter 550 may utilize a single antenna or a set of antennas.

Figure 6:
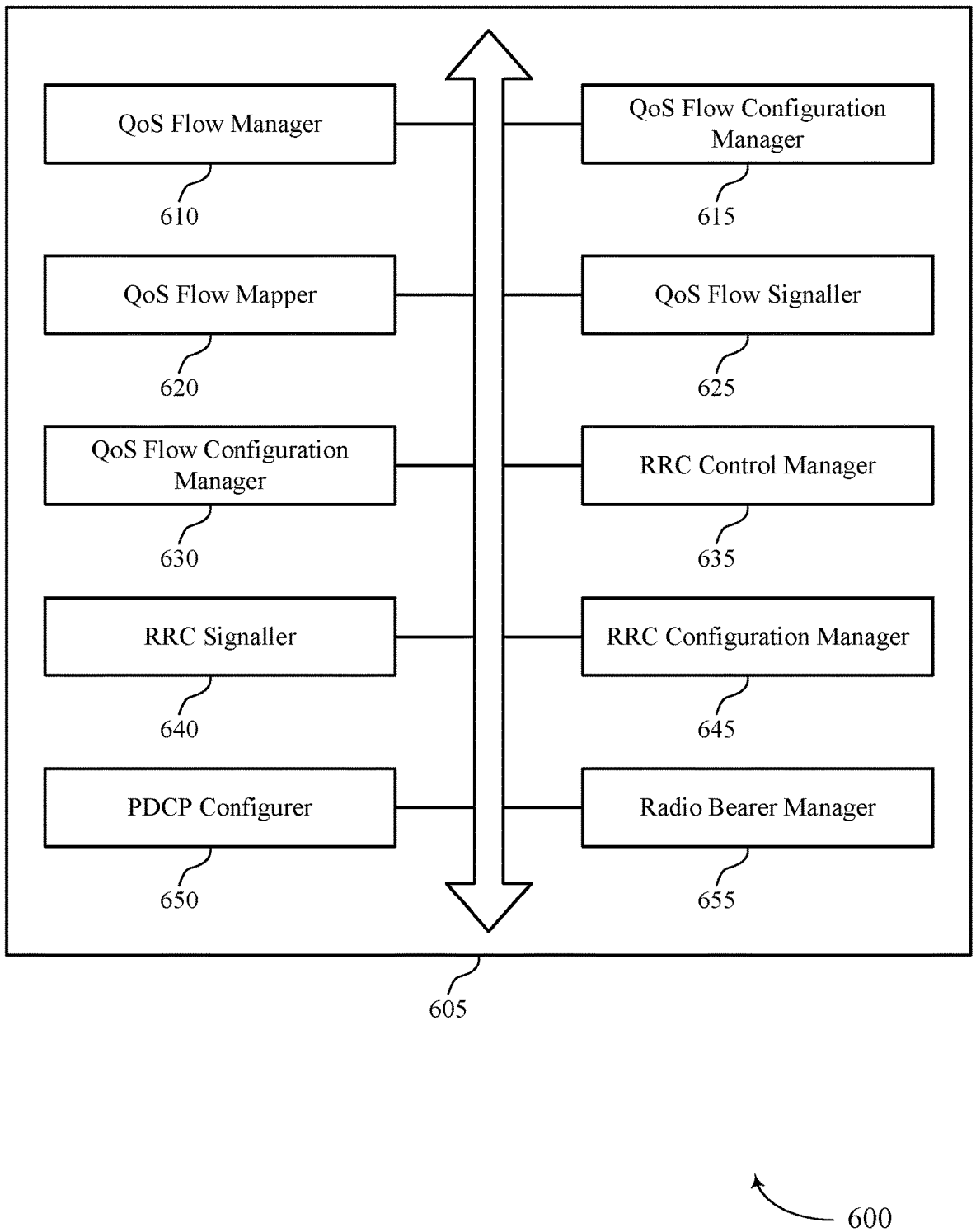
FIG. 6 shows a block diagram of a communications manager that supports remapping QoS flows among data radio bearers in accordance with aspects of the present disclosure.

FIG. 6 shows a block diagram 600 of a communications manager 605 that supports remapping QoS flows among data radio bearers in accordance with aspects of the present disclosure. The communications manager 605 may be an example of aspects of a communications manager 415, a communications manager 515, or a communications manager 710 described herein. The communications manager 605 may include a QoS flow manager 610, a QoS flow configuration manager 615, a QoS flow mapper 620, a QoS flow signaler 625, a QoS flow configuration manager 630, a RRC control manager 635, a RRC signaler 640, a RRC configuration manager 645, a PDCP configurer 650, and a radio bearer manager 655. Each of these modules may communicate, directly or indirectly, with one another (e.g., via one or more buses).

The QoS Flow manager 610 may identify a QoS flow mapped to a first radio bearer, the first radio bearer distinct from a default radio bearer.

The QoS Flow configuration manager 615 may receive configuration information related to a second radio bearer, the second radio bearer distinct from the default radio bearer. In some examples, the QoS Flow configuration manager 615 may determine, after configuring the PDCP entity, whether the RRC configuration message includes configuration information for a SDAP entity for the radio bearer based on the RRC configuration message. In some examples, the QoS Flow configuration manager 615 may determine that the configuration information related to the second radio bearer indicates an addition of the QoS flow to the second radio bearer. In some examples, the QoS Flow configuration manager 615 may receive a control message for the second radio bearer, where the control message for the second radio bearer includes the configuration information related to the second radio bearer. In some examples, the QoS Flow configuration manager 615 may receive a SDAP-Config information element for the second radio bearer. In some examples, the QoS Flow configuration manager 615 may receive configuration information for a set of radio bearers, the set of radio bearers including the first radio bearer and the second radio bearer.

In some examples, the QoS Flow configuration manager 615 may receive a set of SDAP-Config information elements, each SDAP-Config information element of the set corresponding to a respective radio bearer of the set. In some examples, the QoS Flow configuration manager 615 may receive a control message for the first radio bearer, where the control message for the first radio bearer includes the configuration information related to the second radio bearer. In some examples, the QoS Flow configuration manager 615 may receive a SDAP-config information element for the first radio bearer.

In some examples, the QoS Flow configuration manager 615 may identify within the SDAP-Config information element a field indicating that the release procedure includes the remapping procedure. In some cases, the field indicates a remapping of the QoS flow from the first radio bearer to the second radio bearer. In some examples, the QoS Flow configuration manager 615 may identify within the SDAP-Config information element an additional field indicating a release of the QoS flow from the first radio bearer.

In some examples, the QoS Flow configuration manager 615 may perform any identified QoS flow addition procedure prior to performing any identified QoS flow release procedure. In some examples, the QoS Flow configuration manager 615 may receive a control message common to a set of radio bearers, where the control message common to the set of radio bearers includes the configuration information related to the second radio bearer. In some examples, the QoS Flow configuration manager 615 may determine, after establishing the PDCP entity, that the RRC configuration message includes configuration information for the SDAP entity. In some examples, the QoS Flow configuration manager 615 may establish the SDAP entity based on the RRC configuration message. In some examples, the QoS Flow configuration manager 615 may establish the SDAP entity after configuring the PDCP entity.

The QoS Flow mapper 620 may determine a release procedure for the QoS flow from the first radio bearer based on the configuration information related to the second radio bearer. In some examples, the QoS Flow mapper 620 may release the QoS flow from the first radio bearer in accordance with the determined release procedure. In some examples, the QoS Flow mapper 620 may determine a radio bearer via which to transmit an end-marker control PDU for the QoS flow.

In some examples, the QoS Flow mapper 620 may determine to release the QoS flow from the first radio bearer based on the addition of the QoS flow to the second radio bearer. In some examples, the QoS Flow mapper 620 may release the QoS flow from the first radio bearer. In some examples, the QoS Flow mapper 620 may determine that configuration information for the first radio bearer indicates a release of the QoS flow from the first radio bearer. In some examples, the QoS Flow mapper 620 may evaluate, based on the release of the QoS flow from the first radio bearer, the configuration information for each other radio bearer of the set to determine whether the QoS flow is added to any other radio bearer of the set. In some examples, the QoS Flow mapper 620 may determine, based on determining that the QoS flow is added to at least one other radio bearer of the set, not to execute a SDAP procedure for the first radio bearer.

In some examples, the QoS Flow mapper 620 may determine that the release procedure includes a remapping procedure based on the control message for the first radio bearer. Additionally or alternatively, the QoS Flow mapper 620 may determine that the release procedure includes a remapping procedure based on the addition of the QoS flow to the second radio bearer. Additionally or alternatively, the QoS Flow mapper 620 may determine, at a RRC layer that the release procedure includes a remapping procedure based on the control message common to the set of radio bearers received at the QoS Flow configuration manager 615.

The RRC configuration manager 645 may receive an RRC configuration message, the RRC configuration message identifying a radio bearer. In some cases, the RRC configuration message includes an RRC reconfiguration message. In some cases, the RRC configuration message includes a PDCP configuration and/or an SDAP configuration message. In some examples, the RRC configuration manager 645 may determine that the radio bearer identified in the RRC configuration message is unconfigured. In some examples, the RRC configuration manager 645 may determine that the RRC configuration message includes configuration information for the SDAP entity. In some examples, the RRC configuration manager 645 may determine that the radio bearer identified in the RRC configuration message has been previously configured.

The PDCP configurer 650 may configure a PDCP entity for the radio bearer based on the RRC configuration message. In some examples, the PDCP configurer 650 may establish the PDCP entity for the radio bearer. In some examples, configuring the PDCP entity includes at least one of reestablishing the PDCP entity, performing data recovery for the PDCP entity, or reconfiguring the PDCP entity. The PDCP configurer 650 may also process information stored at the PDCP entity based at least in part on the PDCP configuration message. In some cases, the QoS Flow configuration manager 615 may process, at the SDAP entity after the information stored at the PDCP entity is processed, the SDAP configuration message, wherein an end marker PDU is constructed at the SDAP entity based at least in part on processing the SDAP configuration message. The QoS Flow configuration manager 615 may also signal, from the SDAP entity to the PDCP entity, the end marker PDU.

The radio bearer manager 655 may communicate via the radio bearer in accordance with the RRC configuration message.

The QoS Flow signaler 625 may transmit the end-marker control PDU for the QoS flow via the determined radio bearer. In some examples, the QoS Flow signaler 625 may determine, based on determining that the QoS flow is added to at least one other radio bearer of the set, not to transmit an end-marker control PDU for the QoS flow. In some examples, the QoS Flow signaler 625 may determine, based on identifying a QoS flow addition procedure for the QoS flow, not to transmit an end-marker control PDU for the QoS flow. In some examples, the QoS Flow signaler 625 may determine, based on identifying a QoS flow addition procedure for the QoS flow, not to execute a SDAP procedure for the first radio bearer. In some examples, the QoS Flow signaler 625 may transmit, after configuring the PDCP entity, an end-marker control PDU from the SDAP entity to the PDCP entity, the end-marker control PDU for a QoS flow mapped to the radio bearer.

The QoS Flow configuration manager 630 may identify a number of QoS flow addition procedures and a number of QoS flow release procedures based on the configuration information for the set of radio bearers.

The RRC control manager 635 may identify, based on the control message common to the set of radio bearers, a release of the QoS flow from the first radio bearer. In some examples, the RRC control manager 635 may identify, based on the control message common to the set of radio bearers, an addition of the QoS flow to the second radio bearer.

The RRC signaler 640 may transmit, from the RRC layer to a SDAP layer, an indication of the remapping, where receiving the configuration information related to the second radio bearer includes receiving the indication of the remapping at the SDAP layer.

Figure 7:
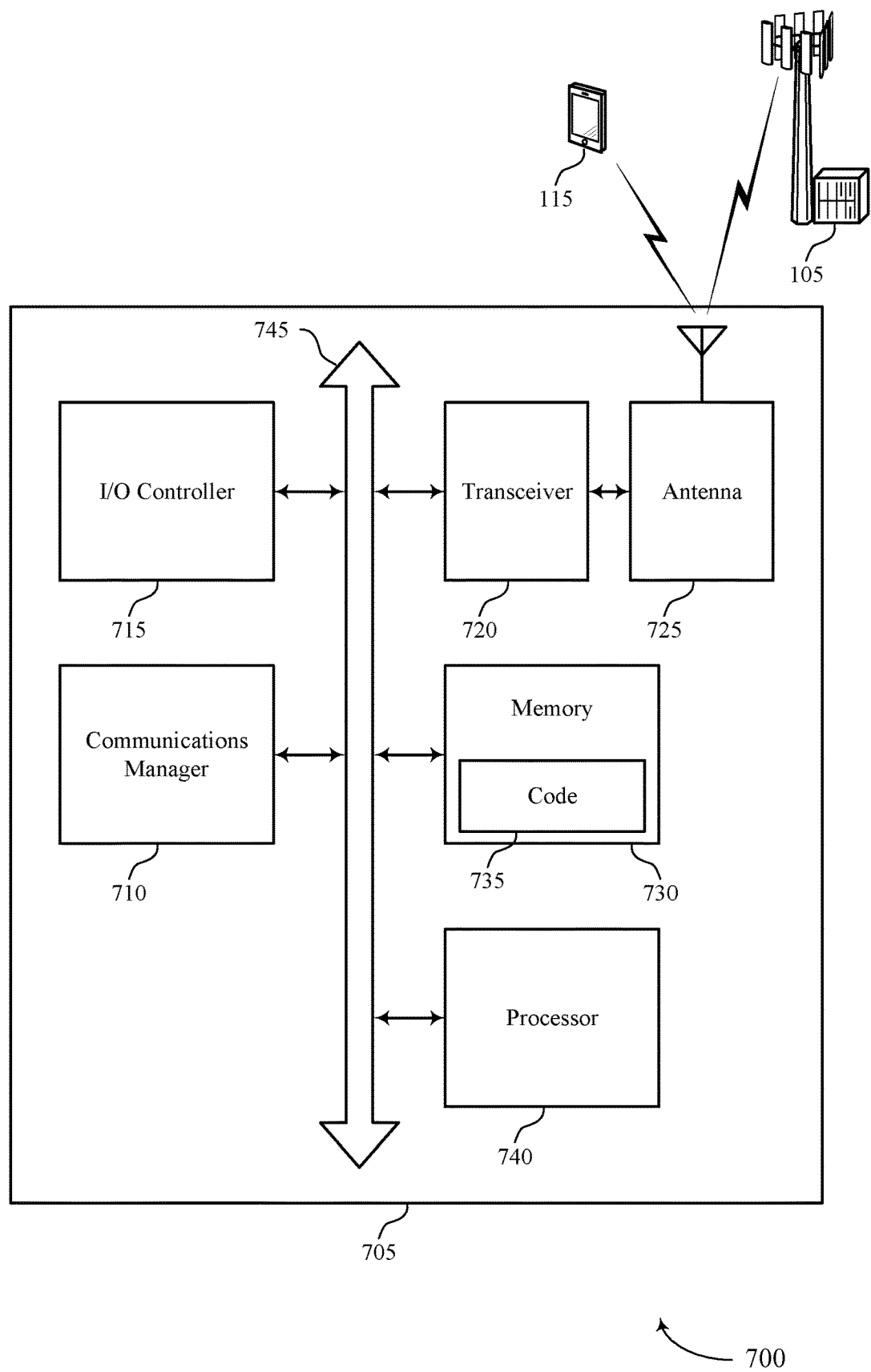
FIG. 7 shows a diagram of a system including a device that supports remapping QoS flows among data radio bearers in accordance with aspects of the present disclosure.

FIG. 7 shows a diagram of a system 700 including a device 705 that supports remapping QoS flows among data radio bearers in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a QoS flow mapped to a first radio bearer, the first radio bearer distinct from a default radio bearer, receive configuration information related to a second radio bearer, the second radio bearer distinct from the default radio bearer, determine a release procedure for the QoS flow from the first radio bearer based on the configuration information related to the second radio bearer, and release the QoS flow from the first radio bearer in accordance with the determined release procedure.

The communications manager 710 may also receive a RRC configuration message, the RRC configuration message identifying a radio bearer, configure a PDCP entity for the radio bearer based on the RRC configuration message, determine, after configuring the PDCP entity, whether the RRC configuration message includes configuration information for a SDAP entity for the radio bearer based on the RRC configuration message, and communicate via the radio bearer in accordance with the RRC configuration message.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting remapping QoS flows among data radio bearers).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
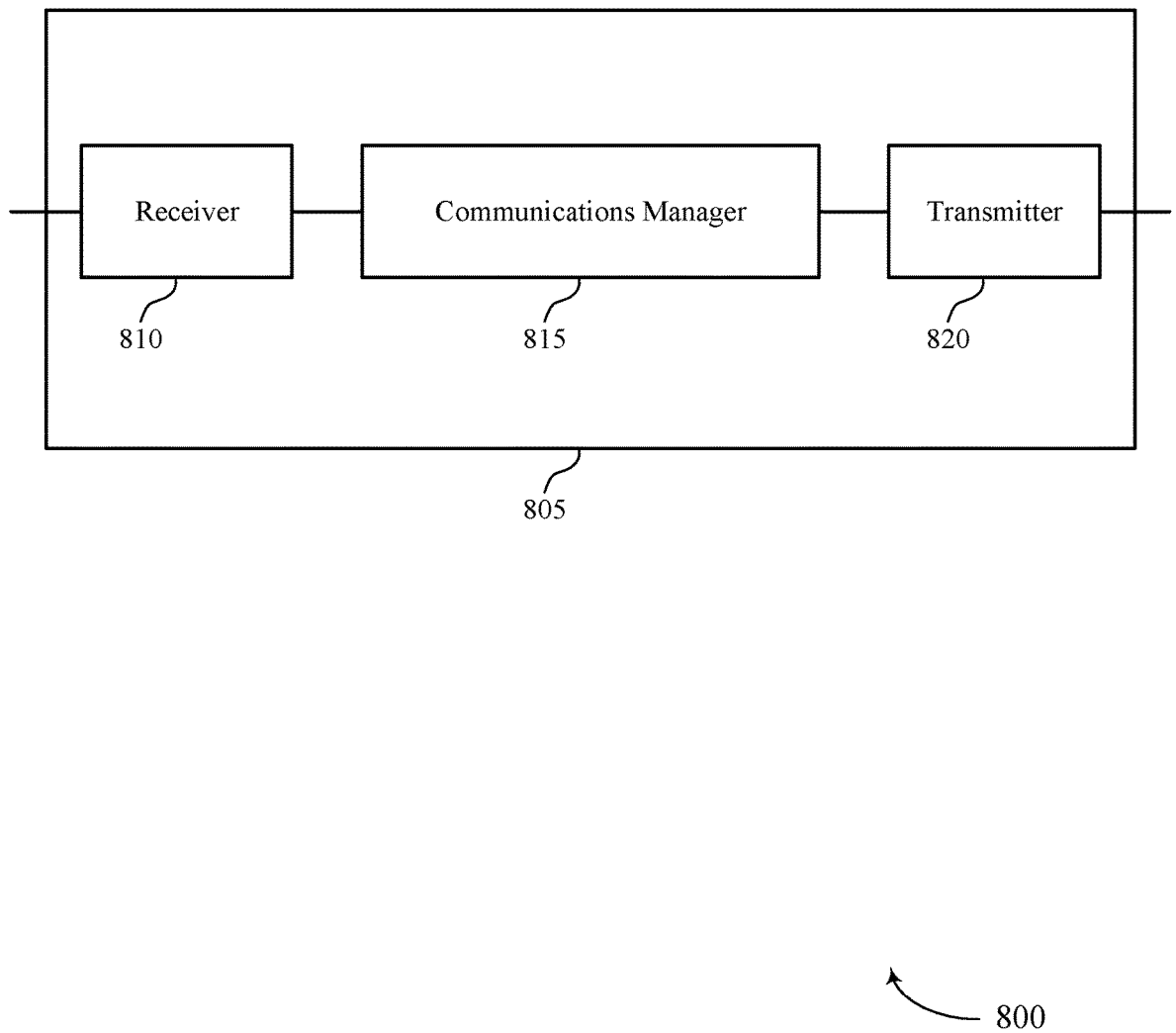
FIGS. 8 and 9 show block diagrams of devices that support remapping QoS flows among data radio bearers in accordance with aspects of the present disclosure.

FIG. 8 shows a block diagram 800 of a device 805 that supports remapping QoS flows among data radio bearers in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to remapping QoS flows among data radio bearers, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a QoS flow mapped to a first radio bearer, the first radio bearer distinct from a default radio bearer, determine a remapping of the QoS flow from the first radio bearer to a second radio bearer, the second radio bearer distinct from the default radio bearer, and transmit configuration information related to the second radio bearer, the configuration information related to the second radio bearer indicating a release procedure for the QoS flow from the first radio bearer. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
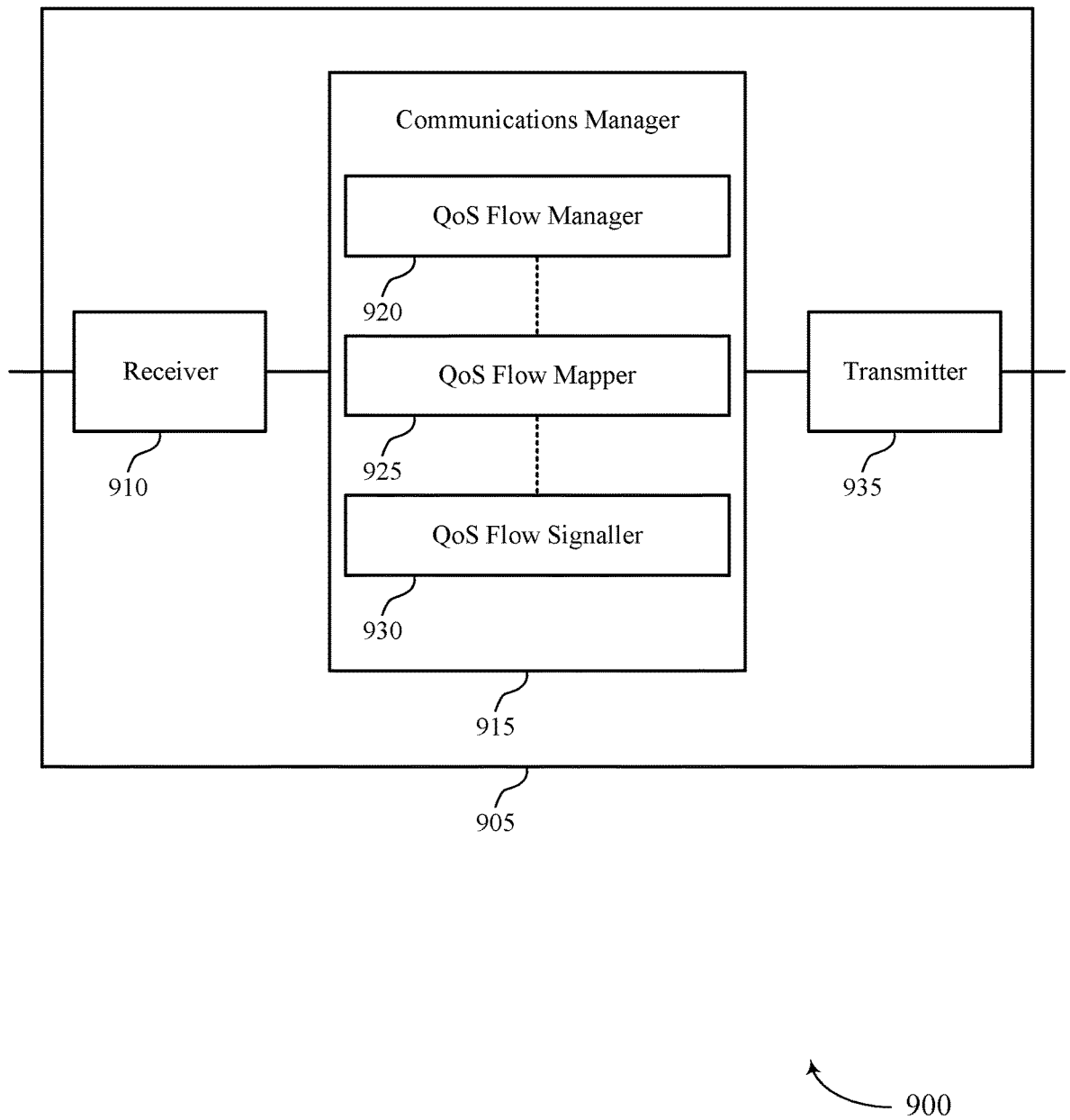

FIG. 9 shows a block diagram 900 of a device 905 that supports remapping QoS flows among data radio bearers in accordance with aspects of the present disclosure. The device 905 may be an example of aspects of a device 805 or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to remapping QoS flows among data radio bearers, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a QoS flow manager 920, a QoS flow mapper 925, and a QoS flow signaler 930. The communications manager 915 may be an example of aspects of the communications manager 1110 described herein.

The QoS Flow manager 920 may identify a QoS flow mapped to a first radio bearer, the first radio bearer distinct from a default radio bearer.

The QoS Flow mapper 925 may determine a remapping of the QoS flow from the first radio bearer to a second radio bearer, the second radio bearer distinct from the default radio bearer.

The QoS Flow signaler 930 may transmit configuration information related to the second radio bearer, the configuration information related to the second radio bearer indicating a release procedure for the QoS flow from the first radio bearer.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
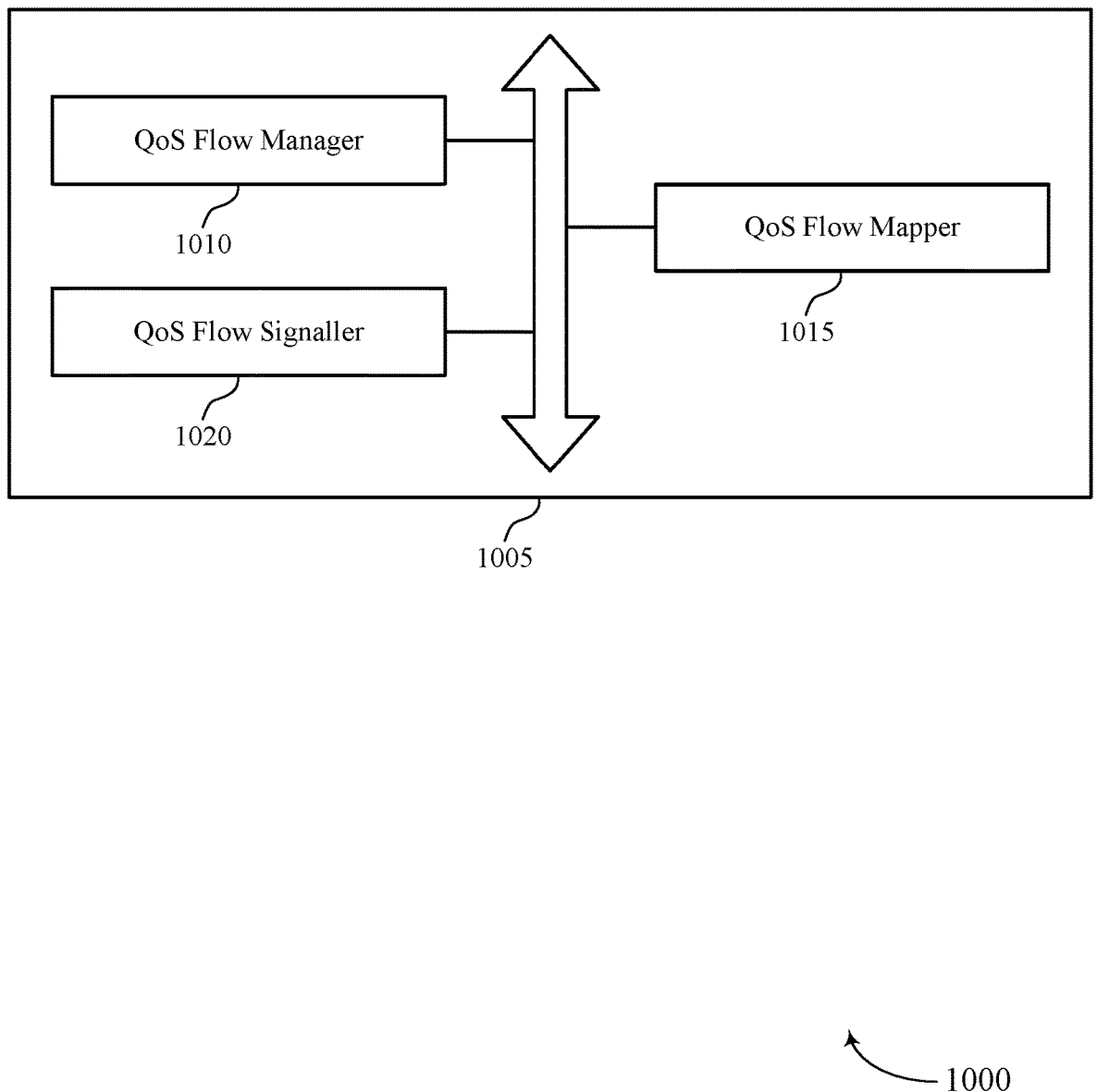
FIG. 10 shows a block diagram of a communications manager that supports remapping QoS flows among data radio bearers in accordance with aspects of the present disclosure.

FIG. 10 shows a block diagram 1000 of a communications manager 1005 that supports remapping QoS flows among data radio bearers in accordance with aspects of the present disclosure. The communications manager 1005 may be an example of aspects of a communications manager 815, a communications manager 915, or a communications manager 1110 described herein. The communications manager 1005 may include a QoS flow manager 1010, a QoS flow mapper 1015, and a QoS flow signaler 1020. Each of these modules may communicate, directly or indirectly, with one another (e.g., via one or more buses).

The QoS Flow manager 1010 may identify a QoS flow mapped to a first radio bearer, the first radio bearer distinct from a default radio bearer.

The QoS Flow mapper 1015 may determine a remapping of the QoS flow from the first radio bearer to a second radio bearer, the second radio bearer distinct from the default radio bearer.

The QoS Flow signaler 1020 may transmit configuration information related to the second radio bearer, the configuration information related to the second radio bearer indicating a release procedure for the QoS flow from the first radio bearer. In some examples, a field indicating that the release procedure includes a remapping procedure may be included within the SDAP-Config information element. In some cases, the field indicates a remapping of the QoS flow from the first radio bearer to the second radio bearer.

In some examples, the QoS Flow signaler 1020 may transmit, as part of the configuration information related to the second radio bearer, an indication of an addition of the QoS flow to the second radio bearer. In some cases, the indication of the addition implicitly indicates that the release procedure includes a remapping procedure.

In some examples, the QoS Flow signaler 1020 may transmit a control message for the second radio bearer, where the control message for the second radio bearer includes the configuration information related to the second radio bearer. In some examples, the QoS Flow signaler 1020 may transmit a SDAP-config information element for the second radio bearer. In some examples, the QoS Flow signaler 1020 may transmit a control message for the first radio bearer, where the control message for the first radio bearer includes the configuration information related to the second radio bearer. In some examples, the QoS Flow signaler 1020 may transmit an SDAP-Config information element for the first radio bearer.

In some examples, the QoS Flow signaler 1020 may transmit within the SDAP-Config information element an additional field indicating a release of the QoS flow from the first radio bearer. In some examples, the QoS Flow signaler 1020 may transmit a control message common to a set of radio bearers. In some examples, the QoS Flow signaler 1020 may transmit, to an RRC layer at a UE, a message that includes an indication that the release procedure is a remapping of the QoS flow from the first radio bearer to the second radio bearer.

Figure 11:
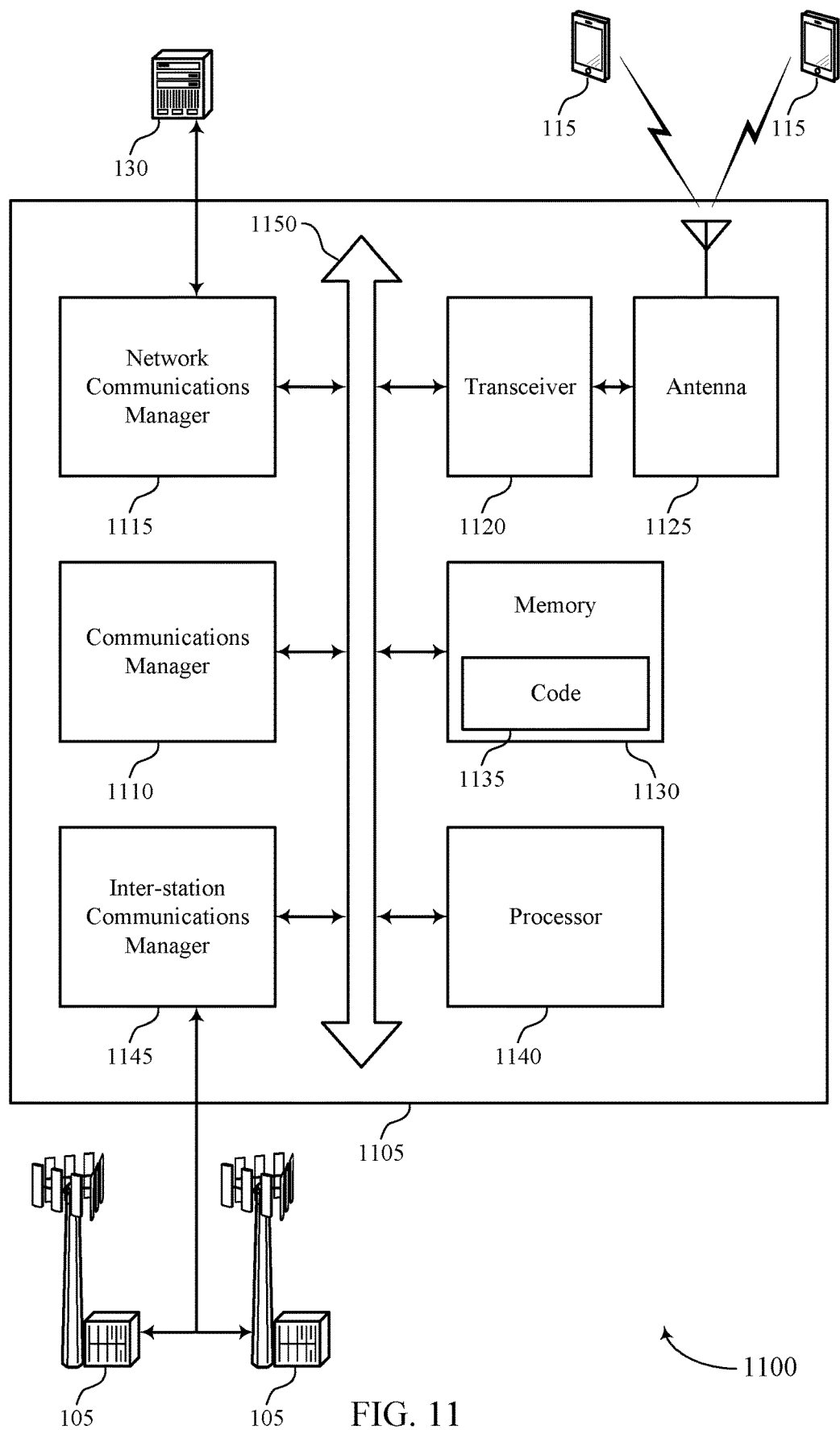
FIG. 11 shows a diagram of a system including a device that supports remapping QoS flows among data radio bearers in accordance with aspects of the present disclosure.

FIG. 11 shows a diagram of a system 1100 including a device 1105 that supports remapping QoS flows among data radio bearers in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify a QoS flow mapped to a first radio bearer, the first radio bearer distinct from a default radio bearer, determine a remapping of the QoS flow from the first radio bearer to a second radio bearer, the second radio bearer distinct from the default radio bearer, and transmit configuration information related to the second radio bearer, the configuration information related to the second radio bearer indicating a release procedure for the QoS flow from the first radio bearer.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device #{device} to perform various functions (e.g., functions or tasks supporting remapping QoS flows among data radio bearers).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
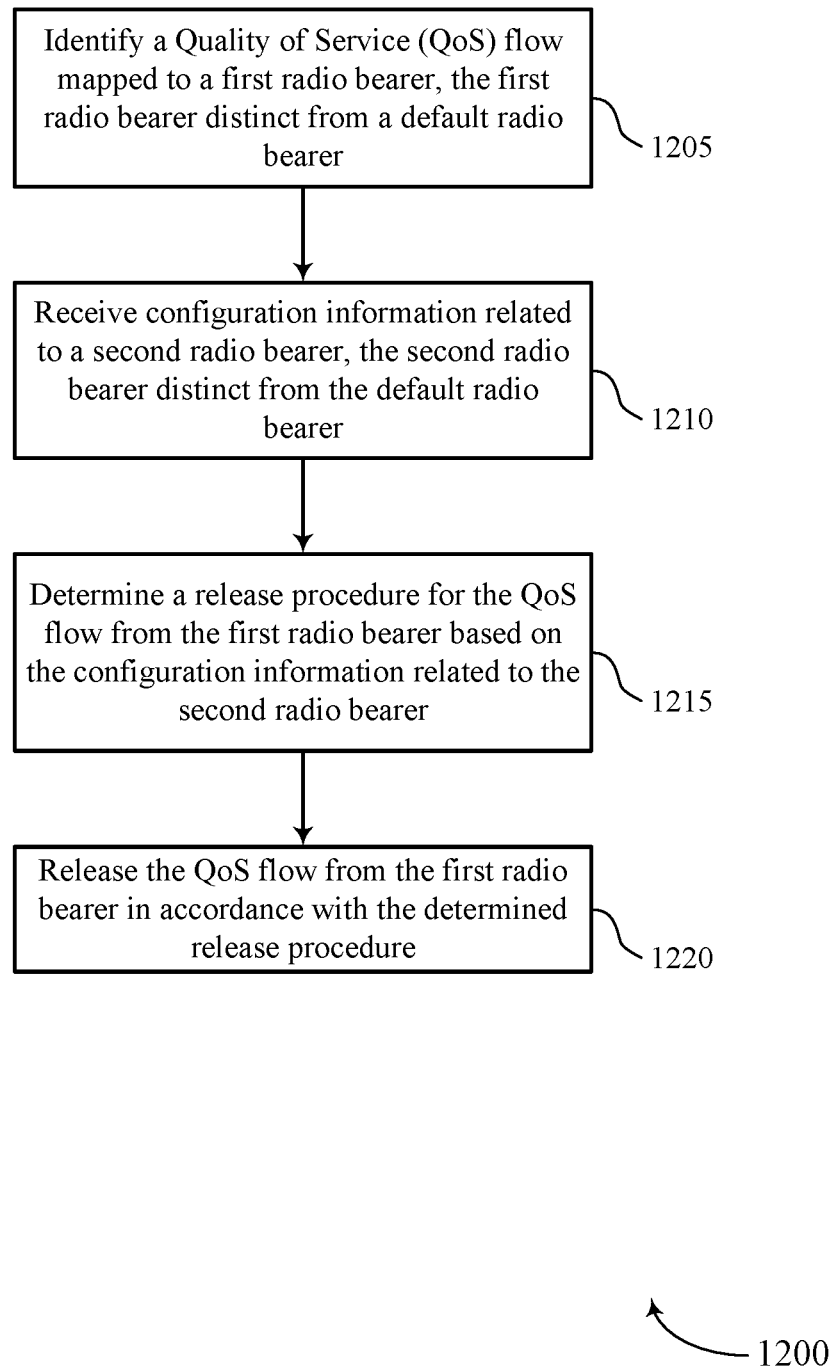
FIGS. 12 through 20 show flowcharts illustrating methods that support remapping QoS flows among data radio bearers in accordance with aspects of the present disclosure.

FIG. 12 shows a flowchart illustrating a method 1200 that supports remapping QoS flows among data radio bearers in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may identify a QoS flow mapped to a first radio bearer, the first radio bearer distinct from a default radio bearer. The operations of 1205 may be performed according to the methods described herein. In some examples, aspects of the operations of 1205 may be performed by a QoS Flow manager as described with reference to FIGS. 4 through 7.

At 1210, the UE may receive configuration information related to a second radio bearer, the second radio bearer distinct from the default radio bearer. The operations of 1210 may be performed according to the methods described herein. In some examples, aspects of the operations of 1210 may be performed by a QoS Flow configuration manager as described with reference to FIGS. 4 through 7.

At 1215, the UE may determine a release procedure for the QoS flow from the first radio bearer based on the configuration information related to the second radio bearer. The operations of 1215 may be performed according to the methods described herein. In some examples, aspects of the operations of 1215 may be performed by a QoS Flow mapper as described with reference to FIGS. 4 through 7.

At 1220, the UE may release the QoS flow from the first radio bearer in accordance with the determined release procedure. The operations of 1220 may be performed according to the methods described herein. In some examples, aspects of the operations of 120 may be performed by a QoS Flow mapper as described with reference to FIGS. 4 through 7.

Figure 13:
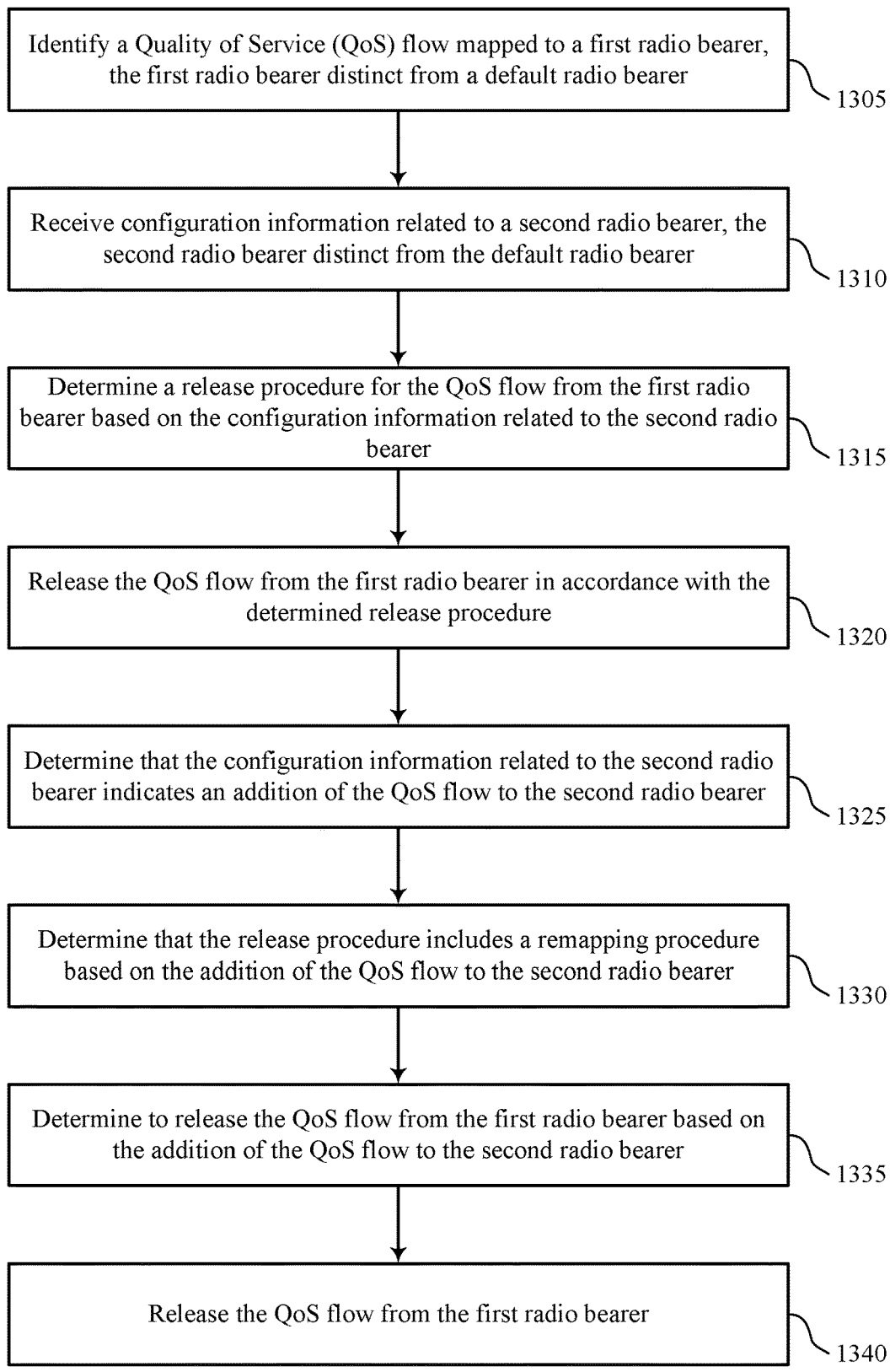

FIG. 13 shows a flowchart illustrating a method 1300 that supports remapping QoS flows among data radio bearers in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may identify a QoS flow mapped to a first radio bearer, the first radio bearer distinct from a default radio bearer. The operations of 1305 may be performed according to the methods described herein. In some examples, aspects of the operations of 1305 may be performed by a QoS Flow manager as described with reference to FIGS. 4 through 7.

At 1310, the UE may receive configuration information related to a second radio bearer, the second radio bearer distinct from the default radio bearer. The operations of 1310 may be performed according to the methods described herein. In some examples, aspects of the operations of 1310 may be performed by a QoS Flow configuration manager as described with reference to FIGS. 4 through 7.

At 1315, the UE may determine a release procedure for the QoS flow from the first radio bearer based on the configuration information related to the second radio bearer. The operations of 1315 may be performed according to the methods described herein. In some examples, aspects of the operations of 1315 may be performed by a QoS Flow mapper as described with reference to FIGS. 4 through 7.

At 1320, the UE may release the QoS flow from the first radio bearer in accordance with the determined release procedure. The operations of 1320 may be performed according to the methods described herein. In some examples, aspects of the operations of 1320 may be performed by a QoS Flow mapper as described with reference to FIGS. 4 through 7.

At 1325, the UE may determine that the configuration information related to the second radio bearer indicates an addition of the QoS flow to the second radio bearer. The operations of 1325 may be performed according to the methods described herein. In some examples, aspects of the operations of 1325 may be performed by a QoS Flow configuration manager as described with reference to FIGS. 4 through 7.

At 1330, the UE may determine that the release procedure includes a remapping procedure based on the addition of the QoS flow to the second radio bearer. The operations of 1330 may be performed according to the methods described herein. In some examples, aspects of the operations of 1330 may be performed by a QoS Flow mapper as described with reference to FIGS. 4 through 7.

At 1335, the UE may determine to release the QoS flow from the first radio bearer based on the addition of the QoS flow to the second radio bearer. The operations of 1335 may be performed according to the methods described herein. In some examples, aspects of the operations of 1335 may be performed by a QoS Flow mapper as described with reference to FIGS. 4 through 7.

At 1340, the UE may release the QoS flow from the first radio bearer. The operations of 1340 may be performed according to the methods described herein. In some examples, aspects of the operations of 1340 may be performed by a QoS Flow mapper as described with reference to FIGS. 4 through 7.

Figure 14:
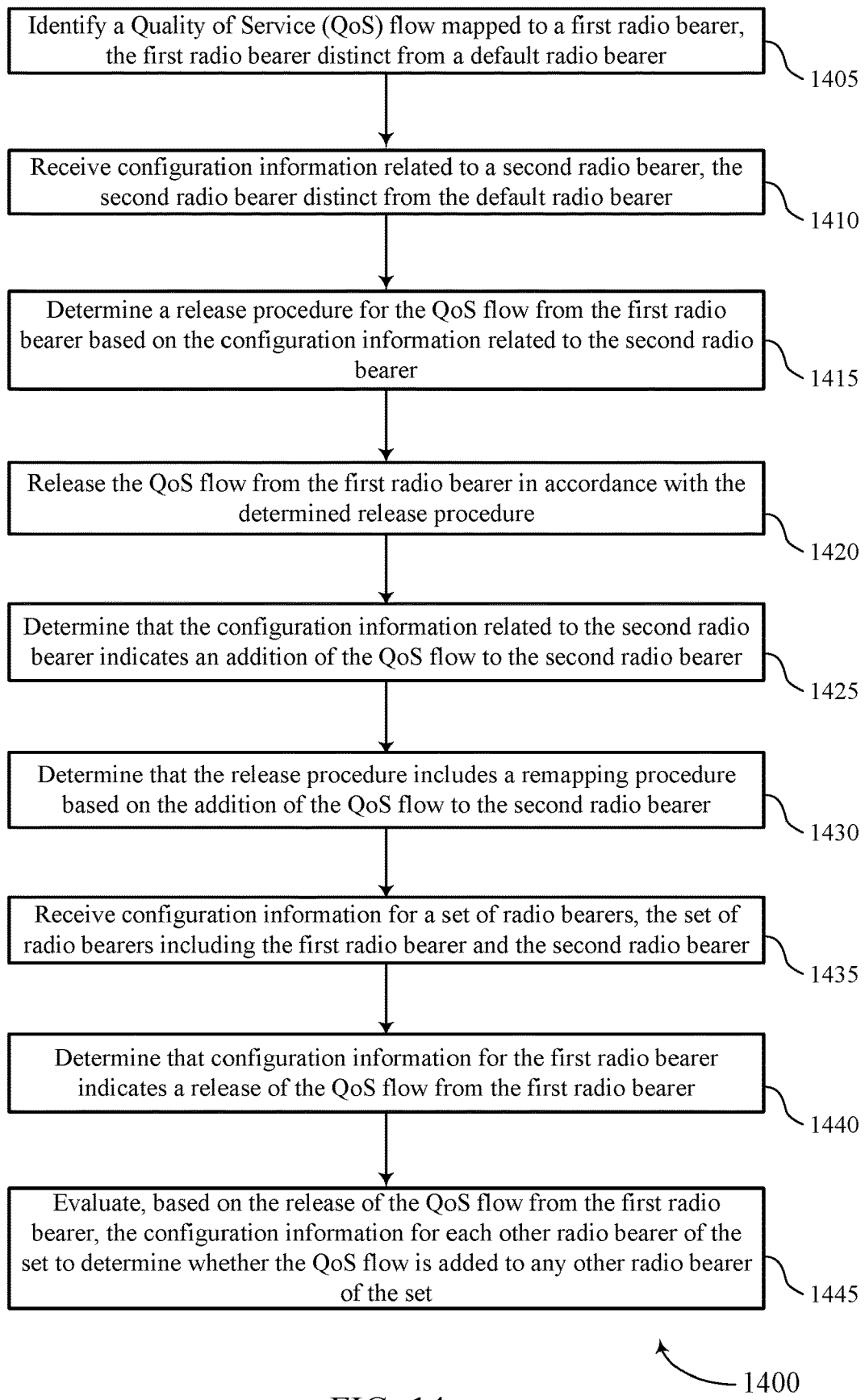

FIG. 14 shows a flowchart illustrating a method 1400 that supports remapping QoS flows among data radio bearers in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may identify a QoS flow mapped to a first radio bearer, the first radio bearer distinct from a default radio bearer. The operations of 1405 may be performed according to the methods described herein. In some examples, aspects of the operations of 1405 may be performed by a QoS Flow manager as described with reference to FIGS. 4 through 7.

At 1410, the UE may receive configuration information related to a second radio bearer, the second radio bearer distinct from the default radio bearer. The operations of 1410 may be performed according to the methods described herein. In some examples, aspects of the operations of 1410 may be performed by a QoS Flow configuration manager as described with reference to FIGS. 4 through 7.

At 1415, the UE may determine a release procedure for the QoS flow from the first radio bearer based on the configuration information related to the second radio bearer. The operations of 1415 may be performed according to the methods described herein. In some examples, aspects of the operations of 1415 may be performed by a QoS Flow mapper as described with reference to FIGS. 4 through 7.

At 1420, the UE may release the QoS flow from the first radio bearer in accordance with the determined release procedure. The operations of 1420 may be performed according to the methods described herein. In some examples, aspects of the operations of 1420 may be performed by a QoS Flow mapper as described with reference to FIGS. 4 through 7.

At 1425, the UE may determine that the configuration information related to the second radio bearer indicates an addition of the QoS flow to the second radio bearer. The operations of 1425 may be performed according to the methods described herein. In some examples, aspects of the operations of 1425 may be performed by a QoS Flow configuration manager as described with reference to FIGS. 4 through 7.

At 1430, the UE may determine that the release procedure includes a remapping procedure based on the addition of the QoS flow to the second radio bearer. The operations of 1430 may be performed according to the methods described herein. In some examples, aspects of the operations of 1430 may be performed by a QoS Flow mapper as described with reference to FIGS. 4 through 7.

At 1435, the UE may receive configuration information for a set of radio bearers, the set of radio bearers including the first radio bearer and the second radio bearer. The operations of 1435 may be performed according to the methods described herein. In some examples, aspects of the operations of 1435 may be performed by a QoS Flow configuration manager as described with reference to FIGS. 4 through 7.

At 1440, the UE may determine that configuration information for the first radio bearer indicates a release of the QoS flow from the first radio bearer. The operations of 1440 may be performed according to the methods described herein. In some examples, aspects of the operations of 1440 may be performed by a QoS Flow mapper as described with reference to FIGS. 4 through 7.

At 1445, the UE may evaluate, based on the release of the QoS flow from the first radio bearer, the configuration information for each other radio bearer of the set to determine whether the QoS flow is added to any other radio bearer of the set. The operations of 1445 may be performed according to the methods described herein. In some examples, aspects of the operations of 1445 may be performed by a QoS Flow mapper as described with reference to FIGS. 4 through 7.

Figure 15:
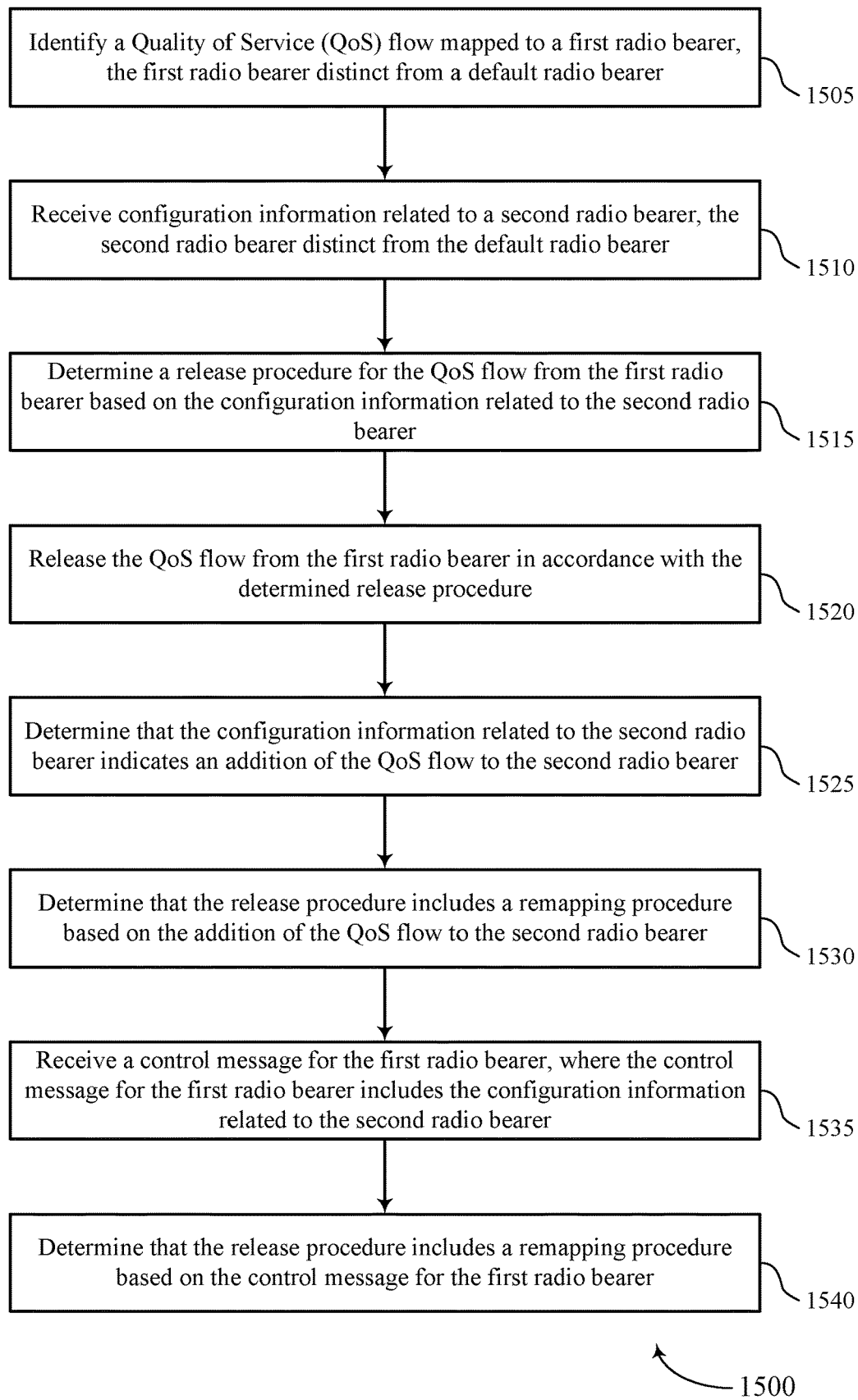

FIG. 15 shows a flowchart illustrating a method 1500 that supports remapping QoS flows among data radio bearers in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may identify a QoS flow mapped to a first radio bearer, the first radio bearer distinct from a default radio bearer. The operations of 1505 may be performed according to the methods described herein. In some examples, aspects of the operations of 1505 may be performed by a QoS Flow manager as described with reference to FIGS. 4 through 7.

At 1510, the UE may receive configuration information related to a second radio bearer, the second radio bearer distinct from the default radio bearer. The operations of 1510 may be performed according to the methods described herein. In some examples, aspects of the operations of 1510 may be performed by a QoS Flow configuration manager as described with reference to FIGS. 4 through 7.

At 1515, the UE may determine a release procedure for the QoS flow from the first radio bearer based on the configuration information related to the second radio bearer. The operations of 1515 may be performed according to the methods described herein. In some examples, aspects of the operations of 1515 may be performed by a QoS Flow mapper as described with reference to FIGS. 4 through 7.

At 1520, the UE may release the QoS flow from the first radio bearer in accordance with the determined release procedure. The operations of 1520 may be performed according to the methods described herein. In some examples, aspects of the operations of 1520 may be performed by a QoS Flow mapper as described with reference to FIGS. 4 through 7.

At 1525, the UE may determine that the configuration information related to the second radio bearer indicates an addition of the QoS flow to the second radio bearer. The operations of 1525 may be performed according to the methods described herein. In some examples, aspects of the operations of 1525 may be performed by a QoS Flow configuration manager as described with reference to FIGS. 4 through 7.

At 1530, the UE may determine that the release procedure includes a remapping procedure based on the addition of the QoS flow to the second radio bearer. The operations of 1530 may be performed according to the methods described herein. In some examples, aspects of the operations of 1530 may be performed by a QoS Flow mapper as described with reference to FIGS. 4 through 7.

At 1535, the UE may receive a control message for the first radio bearer, where the control message for the first radio bearer includes the configuration information related to the second radio bearer. The operations of 1535 may be performed according to the methods described herein. In some examples, aspects of the operations of 1535 may be performed by a QoS Flow configuration manager as described with reference to FIGS. 4 through 7.

At 1540, the UE may determine that the release procedure includes a remapping procedure based on the control message for the first radio bearer. The operations of 1540 may be performed according to the methods described herein. In some examples, aspects of the operations of 1540 may be performed by a QoS Flow mapper as described with reference to FIGS. 4 through 7.

Figure 16:
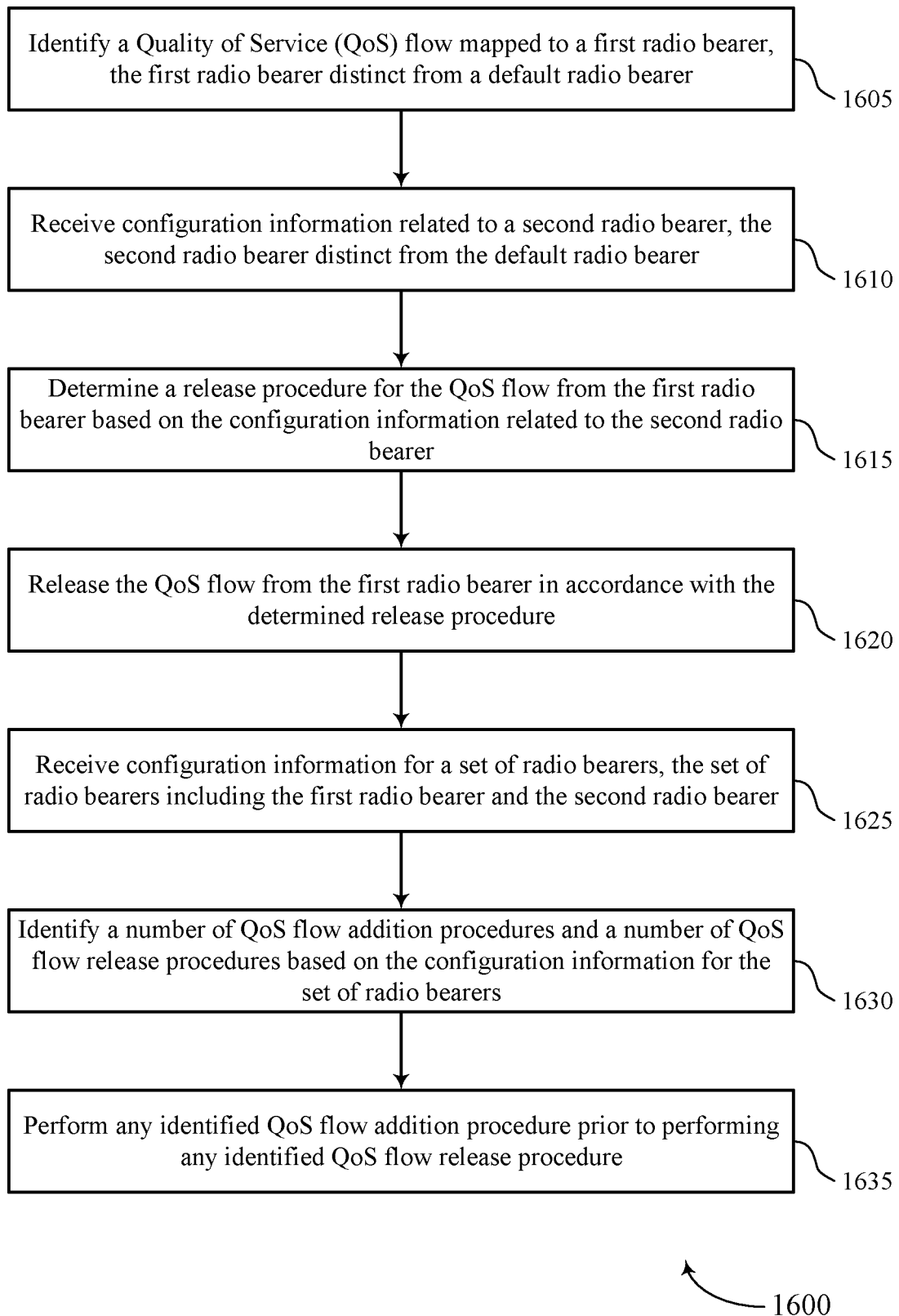

FIG. 16 shows a flowchart illustrating a method 1600 that supports remapping QoS flows among data radio bearers in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1605, the UE may identify a QoS flow mapped to a first radio bearer, the first radio bearer distinct from a default radio bearer. The operations of 1605 may be performed according to the methods described herein. In some examples, aspects of the operations of 1605 may be performed by a QoS Flow manager as described with reference to FIGS. 4 through 7.

At 1610, the UE may receive configuration information related to a second radio bearer, the second radio bearer distinct from the default radio bearer. The operations of 1610 may be performed according to the methods described herein. In some examples, aspects of the operations of 1610 may be performed by a QoS Flow configuration manager as described with reference to FIGS. 4 through 7.

At 1615, the UE may determine a release procedure for the QoS flow from the first radio bearer based on the configuration information related to the second radio bearer. The operations of 1615 may be performed according to the methods described herein. In some examples, aspects of the operations of 1615 may be performed by a QoS Flow mapper as described with reference to FIGS. 4 through 7.

At 1620, the UE may release the QoS flow from the first radio bearer in accordance with the determined release procedure. The operations of 1620 may be performed according to the methods described herein. In some examples, aspects of the operations of 1620 may be performed by a QoS Flow mapper as described with reference to FIGS. 4 through 7.

At 1625, the UE may receive configuration information for a set of radio bearers, the set of radio bearers including the first radio bearer and the second radio bearer. The operations of 1625 may be performed according to the methods described herein. In some examples, aspects of the operations of 1625 may be performed by a QoS Flow configuration manager as described with reference to FIGS. 4 through 7.

At 1630, the UE may identify a number of QoS flow addition procedures and a number of QoS flow release procedures based on the configuration information for the set of radio bearers. The operations of 1630 may be performed according to the methods described herein. In some examples, aspects of the operations of 1630 may be performed by a QoS Flow configuration manager as described with reference to FIGS. 4 through 7.

At 1635, the UE may perform any identified QoS flow addition procedure prior to performing any identified QoS flow release procedure. The operations of 1635 may be performed according to the methods described herein. In some examples, aspects of the operations of 1635 may be performed by a QoS Flow configuration manager as described with reference to FIGS. 4 through 7.

Figure 17:
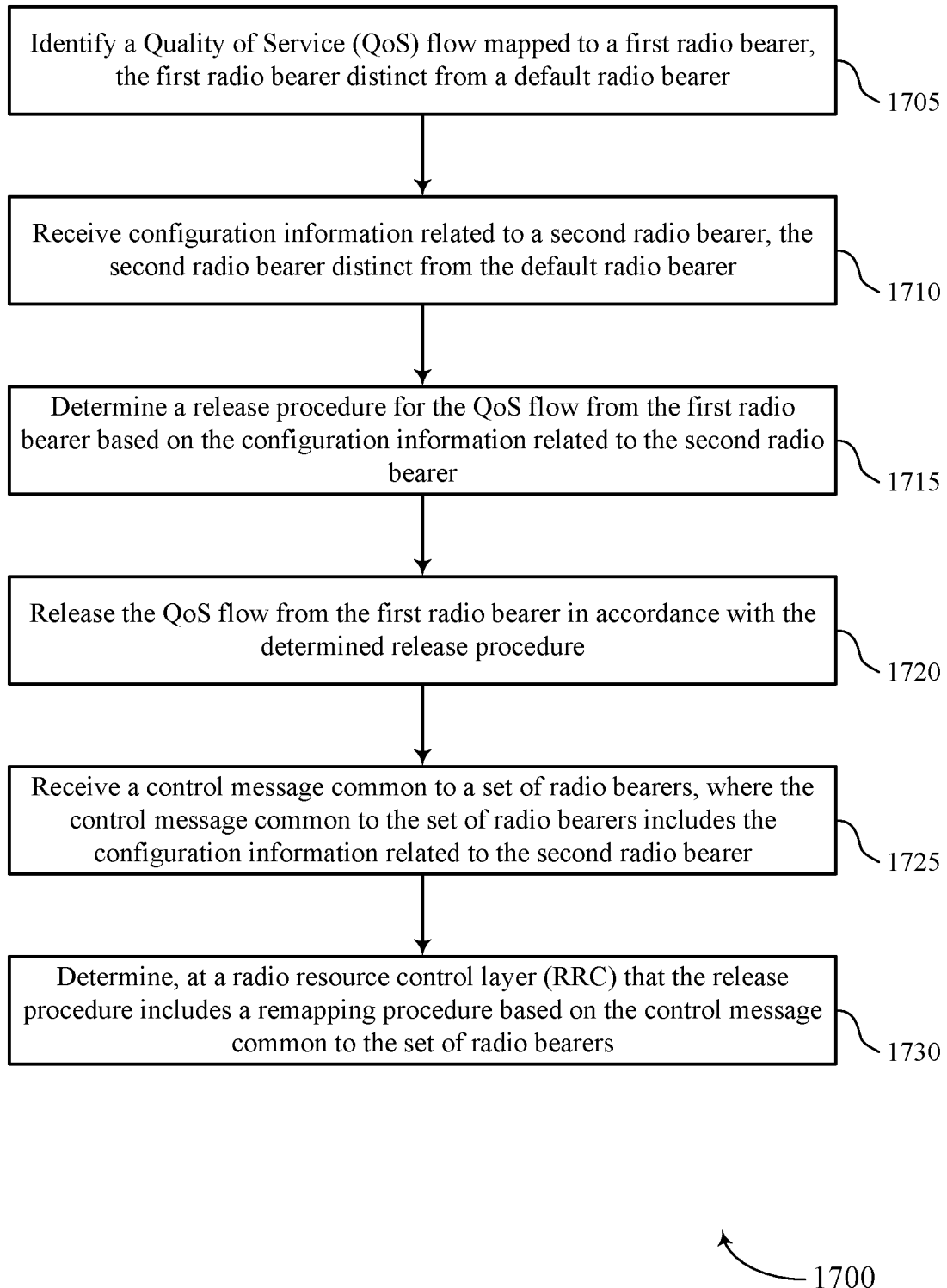

FIG. 17 shows a flowchart illustrating a method 1700 that supports remapping QoS flows among data radio bearers in accordance with aspects of the present disclosure. The operations of method 1700 may be implemented by a UE 115 or its components as described herein. For example, the operations of method 1700 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1705, the UE may identify a QoS flow mapped to a first radio bearer, the first radio bearer distinct from a default radio bearer. The operations of 1705 may be performed according to the methods described herein. In some examples, aspects of the operations of 1705 may be performed by a QoS Flow manager as described with reference to FIGS. 4 through 7.

At 1710, the UE may receive configuration information related to a second radio bearer, the second radio bearer distinct from the default radio bearer. The operations of 1710 may be performed according to the methods described herein. In some examples, aspects of the operations of 1710 may be performed by a QoS Flow configuration manager as described with reference to FIGS. 4 through 7.

At 1715, the UE may determine a release procedure for the QoS flow from the first radio bearer based on the configuration information related to the second radio bearer. The operations of 1715 may be performed according to the methods described herein. In some examples, aspects of the operations of 1715 may be performed by a QoS Flow mapper as described with reference to FIGS. 4 through 7.

At 1720, the UE may release the QoS flow from the first radio bearer in accordance with the determined release procedure. The operations of 1720 may be performed according to the methods described herein. In some examples, aspects of the operations of 1720 may be performed by a QoS Flow mapper as described with reference to FIGS. 4 through 7.

At 1725, the UE may receive a control message common to a set of radio bearers, where the control message common to the set of radio bearers includes the configuration information related to the second radio bearer. The operations of 1725 may be performed according to the methods described herein. In some examples, aspects of the operations of 1725 may be performed by a QoS Flow configuration manager as described with reference to FIGS. 4 through 7.

At 1730, the UE may determine, at a RRC layer that the release procedure includes a remapping procedure based on the control message common to the set of radio bearers. The operations of 1730 may be performed according to the methods described herein. In some examples, aspects of the operations of 1730 may be performed by a QoS Flow mapper as described with reference to FIGS. 4 through 7.

Figure 18:
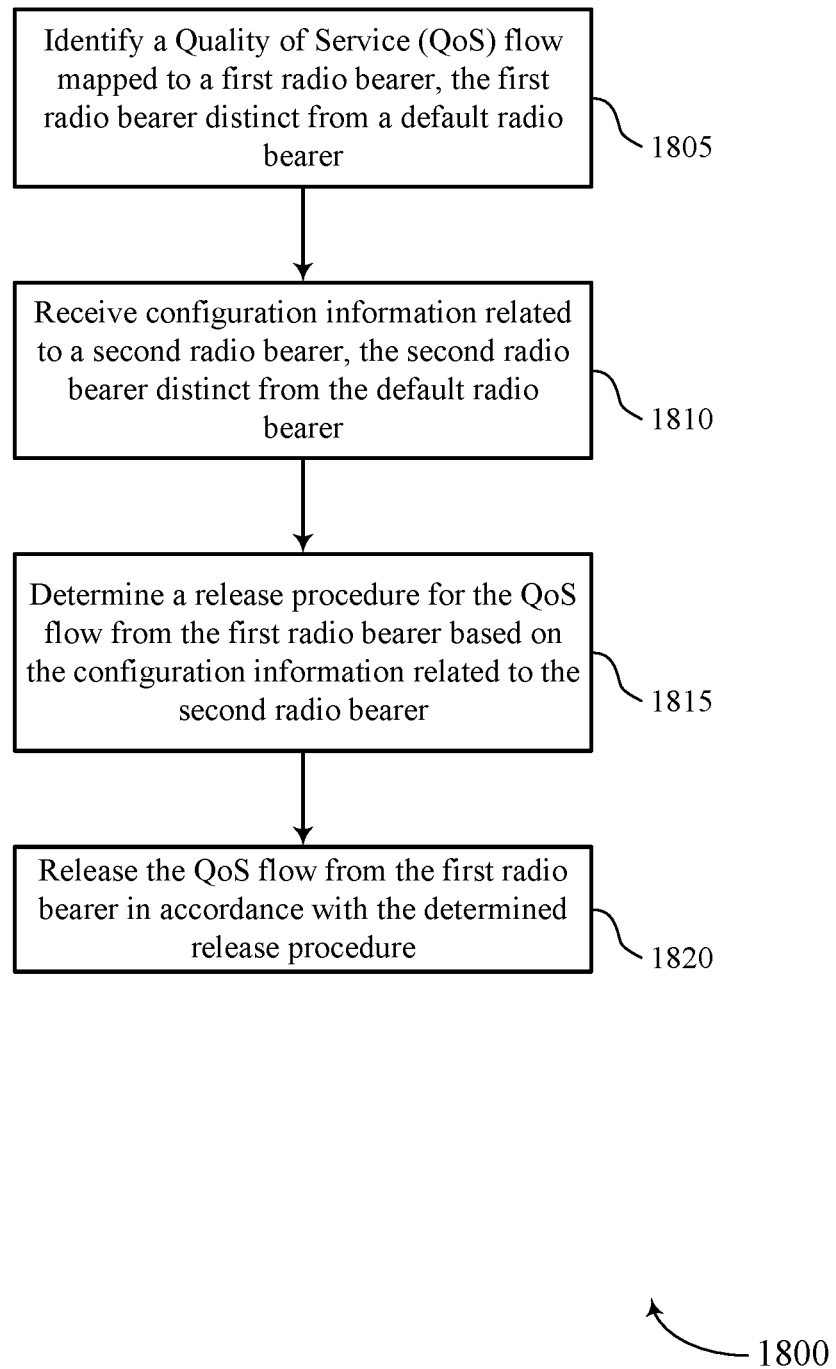

FIG. 18 shows a flowchart illustrating a method 1800 that supports remapping QoS flows among data radio bearers in accordance with aspects of the present disclosure. The operations of method 1800 may be implemented by a UE 115 or its components as described herein. For example, the operations of method 1800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1805, the UE may identify a QoS flow mapped to a first radio bearer, the first radio bearer distinct from a default radio bearer. The operations of 1805 may be performed according to the methods described herein. In some examples, aspects of the operations of 1805 may be performed by a QoS Flow manager as described with reference to FIGS. 4 through 7.

At 1810, the UE may receive configuration information related to a second radio bearer, the second radio bearer distinct from the default radio bearer. The operations of 1810 may be performed according to the methods described herein. In some examples, aspects of the operations of 1810 may be performed by a QoS Flow configuration manager as described with reference to FIGS. 4 through 7.

At 1815, the UE may determine a release procedure for the QoS flow from the first radio bearer based on the configuration information related to the second radio bearer. The operations of 1815 may be performed according to the methods described herein. In some examples, aspects of the operations of 1815 may be performed by a QoS Flow mapper as described with reference to FIGS. 4 through 7.

At 1820, the UE may release the QoS flow from the first radio bearer in accordance with the determined release procedure. The operations of 1820 may be performed according to the methods described herein. In some examples, aspects of the operations of 1820 may be performed by a QoS Flow mapper as described with reference to FIGS. 4 through 7.

Figure 19:
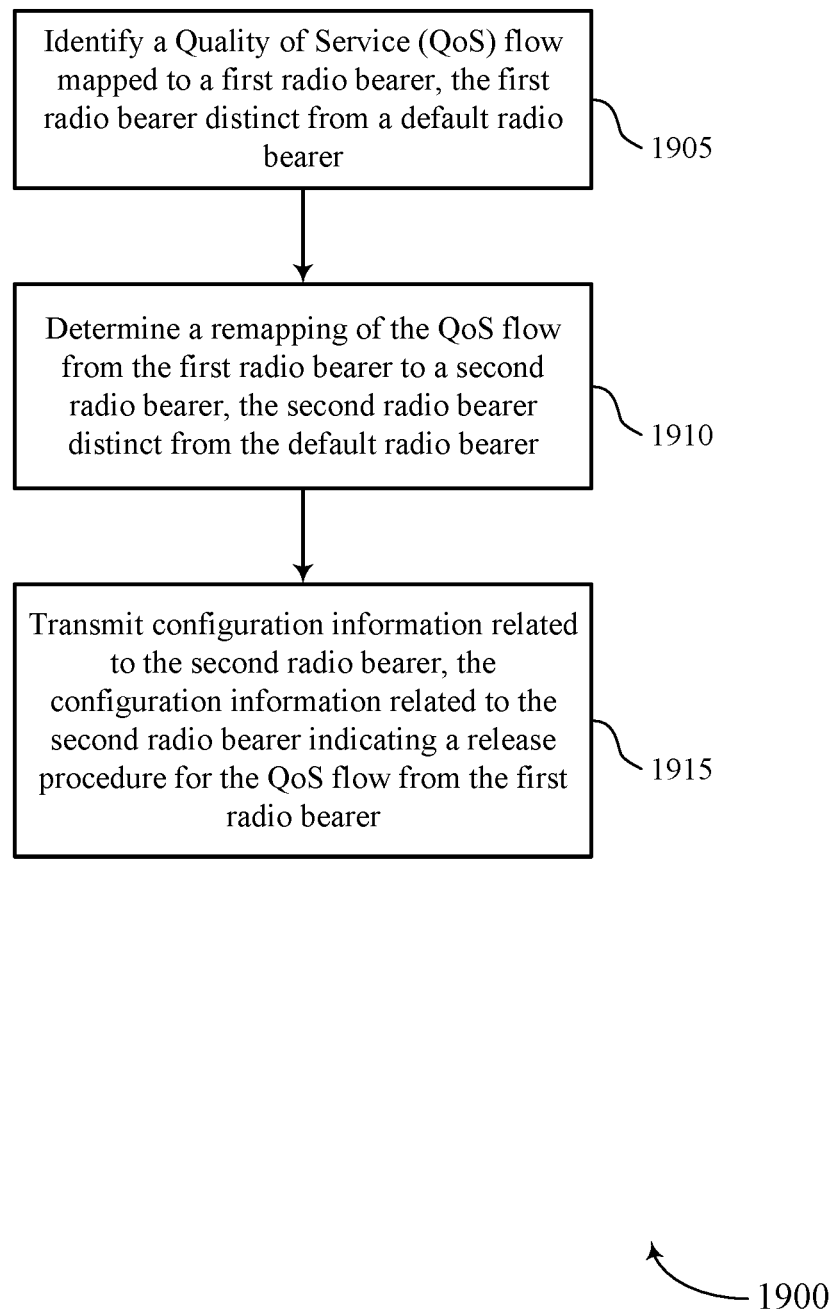

FIG. 19 shows a flowchart illustrating a method 1900 that supports remapping QoS flows among data radio bearers in accordance with aspects of the present disclosure. The operations of method 1900 may be implemented by a base station 105 or its components as described herein. For example, the operations of method 1900 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1905, the base station may identify a QoS flow mapped to a first radio bearer, the first radio bearer distinct from a default radio bearer. The operations of 1905 may be performed according to the methods described herein. In some examples, aspects of the operations of 1905 may be performed by a QoS Flow manager as described with reference to FIGS. 8 through 11.

At 1910, the base station may determine a remapping of the QoS flow from the first radio bearer to a second radio bearer, the second radio bearer distinct from the default radio bearer. The operations of 1910 may be performed according to the methods described herein. In some examples, aspects of the operations of 1910 may be performed by a QoS Flow mapper as described with reference to FIGS. 8 through 11.

At 1915, the base station may transmit configuration information related to the second radio bearer, the configuration information related to the second radio bearer indicating a release procedure for the QoS flow from the first radio bearer. The operations of 1915 may be performed according to the methods described herein. In some examples, aspects of the operations of 1915 may be performed by a QoS Flow signaler as described with reference to FIGS. 8 through 11.

Figure 20:
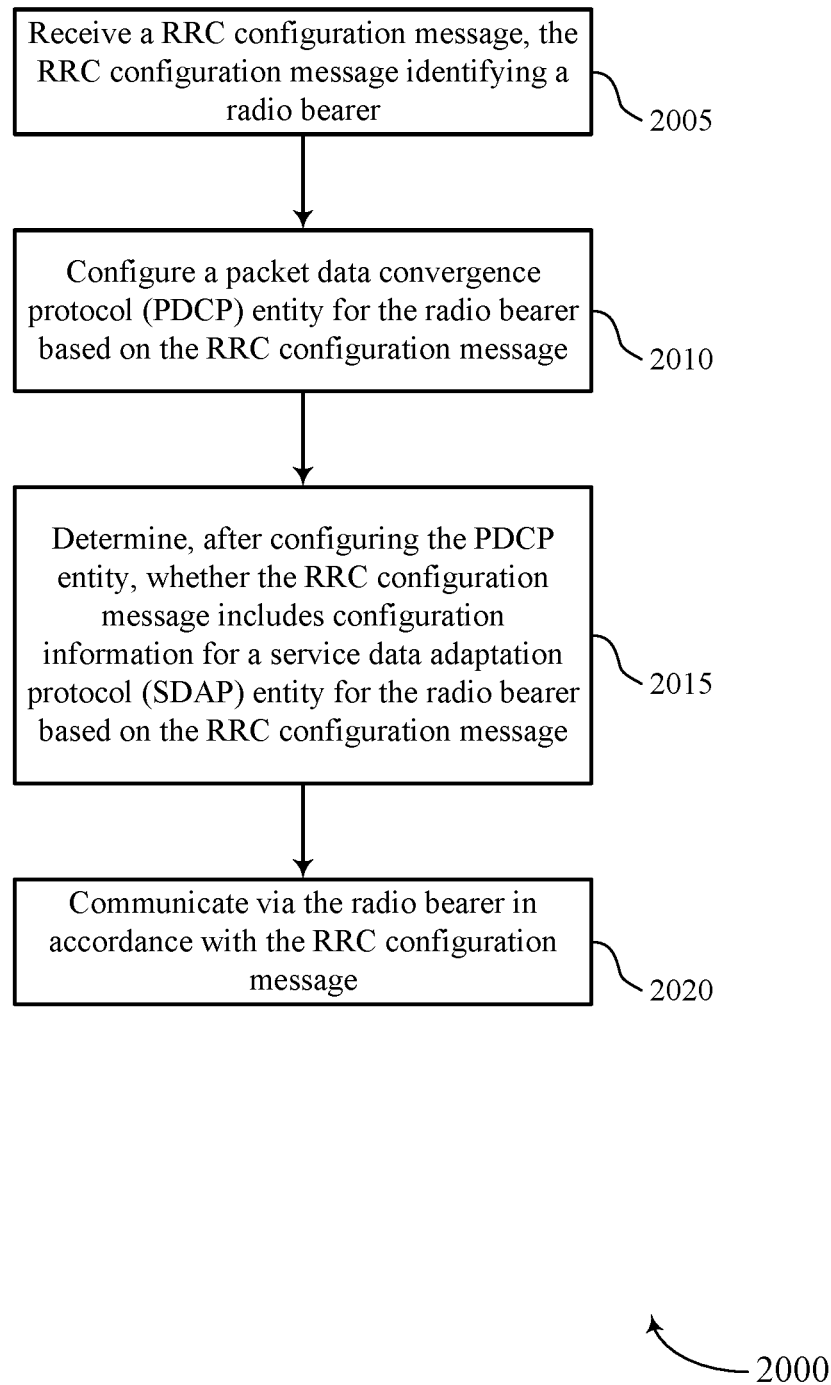

FIG. 20 shows a flowchart illustrating a method 2000 that supports remapping QoS flows among data radio bearers in accordance with aspects of the present disclosure. The operations of method 2000 may be implemented by a UE 115 or its components as described herein. For example, the operations of method 2000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 2005, the UE may receive an RRC configuration message, the RRC configuration message identifying a radio bearer. The operations of 2005 may be performed according to the methods described herein. In some examples, aspects of the operations of 2005 may be performed by an RRC configuration manager as described with reference to FIGS. 4 through 7.

At 2010, the UE may configure a PDCP entity for the radio bearer based on the RRC configuration message. The operations of 2010 may be performed according to the methods described herein. In some examples, aspects of the operations of 2010 may be performed by a PDCP configurer as described with reference to FIGS. 4 through 7.

At 2015, the UE may determine, after configuring the PDCP entity, whether the RRC configuration message includes configuration information for a SDAP entity for the radio bearer based on the RRC configuration message. The operations of 2015 may be performed according to the methods described herein. In some examples, aspects of the operations of 2015 may be performed by a QoS Flow configuration manager as described with reference to FIGS. 4 through 7.

At 2020, the UE may communicate via the radio bearer in accordance with the RRC configuration message. The operations of 2020 may be performed according to the methods described herein. In some examples, aspects of the operations of 2020 may be performed by a radio bearer manager as described with reference to FIGS. 4 through 7.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    identifying a Quality of Service (QoS) flow mapped to a first radio bearer of a plurality of radio bearers, the first radio bearer distinct from a default radio bearer;
    receiving configuration information related to a second radio bearer of the plurality of radio bearers, the second radio bearer distinct from the default radio bearer, and the configuration information comprising an indication of an addition of the QoS flow to the second radio bearer;
    determining a release procedure for the QoS flow from the first radio bearer based at least in part on the configuration information comprising the indication of the addition of the QoS flow to the second radio bearer; and
    releasing the QoS flow from the first radio bearer in accordance with the determined release procedure.

2. The method of claim 1, wherein releasing the QoS flow from the first radio bearer in accordance with the determined release procedure comprises:
    determining a radio bearer via which to transmit an end-marker control protocol data unit (PDU) for the QoS flow; and
    transmitting the end-marker control PDU for the QoS flow via the determined radio bearer.

3. The method of claim 1, further comprising:
    determining that the configuration information related to the second radio bearer indicates an addition of the QoS flow to the second radio bearer; and determining that the release procedure comprises a remapping procedure based at least in part on the addition of the QoS flow to the second radio bearer.

4. The method of claim 3, further comprising:
determining to release the QoS flow from the first radio bearer based at least in part on the addition of the QoS flow to the second radio bearer; and
releasing the QoS flow from the first radio bearer.

5. The method of claim 3, further comprising:
receiving a control message for the second radio bearer, wherein the control message for the second radio bearer includes the configuration information related to the second radio bearer.

6. The method of claim 5, wherein receiving the control message for the second radio bearer comprises:
receiving a service data adaptation protocol (SDAP) configuration (SDAP Config) information element for the second radio bearer.

7. The method of claim 3, further comprising:
receiving configuration information for a plurality of radio bearers, the plurality of radio bearers including the first radio bearer and the second radio bearer;
determining that configuration information for the first radio bearer indicates a release of the QoS flow from the first radio bearer; and
evaluating, based at least in part on the release of the QoS flow from the first radio bearer, the configuration information for each other radio bearer of the plurality of radio bearers to determine whether the QoS flow is added to any other radio bearer of the plurality of radio bearers.

8. The method of claim 7, wherein receiving configuration information for the plurality of radio bearers comprises:
receiving a plurality of service data adaptation protocol (SDAP) configuration (SDAP Config) information elements, each SDAP Config information element of the plurality of SDAP-Config information elements corresponding to a respective radio bearer of the plurality of radio bearers.

9. The method of claim 7, wherein releasing the QoS flow from the first radio bearer in accordance with the determined release procedure comprises:
determining, based at least in part on determining that the QoS flow is added to at least one other radio bearer of the plurality of radio bearers, not to transmit an end-marker control protocol data unit (PDU) for the QoS flow.

10. The method of claim 7, wherein releasing the QoS flow from the first radio bearer in accordance with the determined release procedure comprises:
determining, based at least in part on determining that the QoS flow is added to at least one other radio bearer of the plurality of radio bearers, not to execute a service data adaptation protocol (SDAP) procedure for the first radio bearer.

11. The method of claim 1, further comprising:
receiving configuration information for a plurality of radio bearers, the plurality of radio bearers including the first radio bearer and the second radio bearer;
identifying a number of QoS flow addition procedures and a number of QoS flow release procedures based at least in part on the configuration information for the plurality of radio bearers; and
performing any identified QoS flow addition procedure prior to performing any identified QoS flow release procedure.

12. The method of claim 11, wherein receiving configuration information for the plurality of radio bearers comprises:
receiving a plurality of service data adaptation protocol (SDAP) configuration (SDAP Config) information elements, each SDAP Config information element of the plurality of SDAP-Config information elements corresponding to a respective radio bearer of the plurality of radio bearers.

13. The method of claim 11, wherein releasing the QoS flow from the first radio bearer in accordance with the determined release procedure comprises:
determining, based at least in part on identifying a QoS flow addition procedure for the QoS flow, not to transmit an end-marker control protocol data unit (PDU) for the QoS flow.

14. The method of claim 11, wherein releasing the QoS flow from the first radio bearer in accordance with the determined release procedure comprises:
determining, based at least in part on identifying a QoS flow addition procedure for the QoS flow, not to execute a service data adaptation protocol (SDAP) procedure for the first radio bearer.

15. A method for wireless communications at a base station, comprising:
identifying a Quality of Service (QoS) flow mapped to a first radio bearer of a plurality of radio bearers, the first radio bearer distinct from a default radio bearer;
determining a remapping of the QoS flow from the first radio bearer to a second radio bearer of the plurality of radio bearers, the second radio bearer distinct from the default radio bearer; and
transmitting configuration information related to the second radio bearer, the configuration information related to the second radio bearer comprising an indication of an addition of the QoS flow to the second radio bearer and an indication of a release procedure for the QoS flow from the first radio bearer.

16. The method of claim 15, wherein the indication of the addition implicitly indicates that the release procedure comprises a remapping procedure.

17. The method of claim 15, wherein transmitting the configuration information related to the second radio bearer comprises:
transmitting a control message for the second radio bearer, wherein the control message for the second radio bearer includes the configuration information related to the second radio bearer.

18. The method of claim 17, wherein transmitting the control message for the second radio bearer comprises:
transmitting a service data adaptation protocol (SDAP) configuration (SDAP Config) information element for the second radio bearer.

19. A method for wireless communications at a user equipment (UE), comprising:
receiving a radio resource control (RRC) configuration message, the RRC configuration message identifying a radio bearer;
configuring a packet data convergence protocol (PDCP) entity for the radio bearer based at least in part on the RRC configuration message;
determining, after configuring the PDCP entity, whether the RRC configuration message includes configuration information for a service data adaptation protocol (SDAP) entity for the radio bearer based at least in part on the RRC configuration message; and communicating via the radio bearer in accordance with the RRC configuration message.

20. The method of claim 19, further comprising:
determining that the radio bearer identified in the RRC configuration message is unconfigured.

21. The method of claim 20, further comprising:
establishing the PDCP entity for the radio bearer;
determining, after establishing the PDCP entity, that the RRC configuration message includes configuration information for the SDAP entity; and
establishing the SDAP entity based at least in part on the RRC configuration message.

22. The method of claim 21, further comprising:
transmitting, after configuring the PDCP entity, an end-marker control protocol data unit (PDU) from the SDAP entity to the PDCP entity, wherein the end-marker control PDU for a Quality of Service (QoS) flow is mapped to the radio bearer.

23. The method of claim 20, wherein:
configuring the PDCP entity comprises at least one of reestablishing the PDCP entity, performing data recovery for the PDCP entity, or reconfiguring the PDCP entity.

24. The method of claim 20, further comprising:
determining that the RRC configuration message includes configuration information for the SDAP entity; and
establishing the SDAP entity after configuring the PDCP entity.

25. The method of claim 24, further comprising:
transmitting, after configuring the PDCP entity, an end-marker control protocol data unit (PDU) from the SDAP entity to the PDCP entity, wherein the end-marker control PDU is for a Quality of Service (QoS) flow mapped to the radio bearer.

26. The method of claim 19, further comprising:
determining that the radio bearer identified in the RRC configuration message has been previously configured.

27. The method of claim 19, wherein the RRC configuration message comprises an RRC reconfiguration message.

28. The method of claim 19, wherein the RRC configuration message comprises a PDCP configuration message and an SDAP configuration message, the method further comprising;
processing information stored at the PDCP entity based at least in part on the PDCP configuration message;
processing, at the SDAP entity after the information stored at the PDCP entity is processed, the SDAP configuration message, wherein an end marker PDU is constructed at the SDAP entity based at least in part on processing the SDAP configuration message; and
signaling, from the SDAP entity to the PDCP entity, the end marker PDU.

29. An apparatus for wireless communications at a user equipment (UE), comprising:
a processor,
memory coupled with the processor; and
instructions stored in the memory and executable by the processor to cause the apparatus to:
identify a Quality of Service (QoS) flow mapped to a first radio bearer of a plurality of radio bearers, the first radio bearer distinct from a default radio bearer;
receive configuration information related to a second radio bearer of the plurality of radio bearers, the second radio bearer distinct from the default radio bearer, and the configuration information comprising an indication of an addition of the QoS flow to the second radio bearer;
determine a release procedure for the QoS flow from the first radio bearer based at least in part on the configuration information comprising the indication of the addition of the QoS flow to the second radio bearer; and
release the QoS flow from the first radio bearer in accordance with the determined release procedure.

* * * * *